(12) United States Patent
Gu et al.

(10) Patent No.: US 10,810,016 B2
(45) Date of Patent: Oct. 20, 2020

(54) OPERATING METHODS OF COMPUTING DEVICES COMPRISING STORAGE DEVICES INCLUDING NONVOLATILE MEMORY DEVICES, BUFFER MEMORIES AND CONTROLLERS

(71) Applicant: Samsung Electronics Co., Ltd., Suwon-si, Gyeonggi-do (KR)

(72) Inventors: Bon Cheol Gu, Seongnam-si (KR); Duckho Bae, Seoul (KR); Jong Hyun Yoon, Hwaseong-si (KR); Jinyoung Lee, Anyang-si (KR); Insoon Jo, Hwaseong-si (KR); MoonSang Kwon, Seoul (KR); Sungho Yoon, Seoul (KR); Sangyeun Cho, Seongnam-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 503 days.

(21) Appl. No.: 15/156,855

(22) Filed: May 17, 2016

(65) Prior Publication Data

US 2017/0046170 A1 Feb. 16, 2017

(30) Foreign Application Priority Data

Aug. 11, 2015 (KR) ........................ 10-2015-0113397

(51) Int. Cl.
*G06F 9/00* (2006.01)
*G06F 15/177* (2006.01)
*G06F 9/4401* (2018.01)

(52) U.S. Cl.
CPC .......... *G06F 9/4403* (2013.01); *G06F 9/4401* (2013.01)

(58) Field of Classification Search
CPC ............... G06F 21/566; G06F 11/1451; G06F 11/1461; G06F 17/30554; G06F 21/575; G06F 21/78; G06F 3/0619
See application file for complete search history.

(56) References Cited

U.S. PATENT DOCUMENTS 5,339,438 A * 8/1994 Conner ................. G06F 9/4433
717/153
6,658,421 B1 * 12/2003 Seshadri ................... G06F 8/41
707/999.1

(Continued)

FOREIGN PATENT DOCUMENTS

| KR | 10-2012-0109753 | 10/2012 |
| KR | 10-1231054 B1 | 2/2013 |
| KR | 10-1453663 B1 | 10/2014 |

OTHER PUBLICATIONS

W. Fang, B. He, Q. Luo, and N. K. Govindaraju, "Mars: Accelerating MapReduce with Graphics Processors," IEEE Transactions on Parallel and Distributed Systems, vol. 22. No. 4, Apr. 2011.

(Continued)

*Primary Examiner* — Mohammed H Rehman
(74) *Attorney, Agent, or Firm* — Harness, Dickey & Pierce, P.L.C.

(57) ABSTRACT

A method of operating a computing device includes a storage device receiving a request to execute an application instance, and executing the application instance at the storage device in response to the received request by the storage device. The application instance includes a plurality of storage instances connected with one another, and at least one of the plurality of storage instances is connected to a host device.

20 Claims, 17 Drawing Sheets

(56) References Cited

U.S. PATENT DOCUMENTS

| | | | |
|---|---|---|---|
| 7,679,133 | B2 | 3/2010 | Son et al. |
| 7,761,668 | B2 | 7/2010 | Sutardja |
| 7,801,895 | B2 | 9/2010 | Hepper et al. |
| 8,438,321 | B2 | 5/2013 | Elzur et al. |
| 8,458,129 | B2 | 6/2013 | Surlaker et al. |
| 8,553,466 | B2 | 10/2013 | Han et al. |
| 8,559,235 | B2 | 10/2013 | Yoon et al. |
| 8,593,307 | B2 | 11/2013 | Seo et al. |
| 8,654,587 | B2 | 2/2014 | Yoon et al. |
| 8,838,577 | B2 | 9/2014 | Sukhwani et al. |
| 2007/0234342 | A1* | 10/2007 | Flynn, Jr. .............. G06F 9/4856 717/174 |
| 2008/0275900 | A1* | 11/2008 | Zurek .................. G06F 16/283 |
| 2011/0233648 | A1 | 9/2011 | Seol et al. |
| 2013/0238582 | A1 | 9/2013 | Li et al. |
| 2014/0379966 | A1 | 12/2014 | Nochimowski et al. |
| 2015/0149695 | A1 | 5/2015 | Khan et al. |
| 2015/0242160 | A1* | 8/2015 | Myouga ................ G06F 3/0659 711/103 |
| 2016/0210132 | A1* | 7/2016 | Gerhart .................... G06F 8/65 |

OTHER PUBLICATIONS

J. Do, Y.-S. Kee, J. M. Patel, C. Park, K. Park, and D. J. DeWitt, "Query Processing on Smart SSDs: Opportunities and Challenges," in Proc. of SIGMOD. ACM, 2013, pp. 1221-1230.

S. Cho, C. Park, H. Oh, S. Kim, Y. Yi, and G. R. Ganger, "Active Disk Meets Flash: A Case for Intelligent SSDs." in Proc. Of ICS. ACM, 2013, pp. 91-102.

Chungmin Melvin Chen, Nick Roussopoulos, Adaptive selectivity estimation using query; feedback, SIGMOD'94; College Park, UMD, 1994.

Clifford A. Lynch, selectivity estimation and query optimization in large databases with; highly skewed distributions of column values, VLDB; UC Barley CA, 1988.

* cited by examiner

OPERATING METHODS OF COMPUTING DEVICES COMPRISING STORAGE DEVICES INCLUDING NONVOLATILE MEMORY DEVICES, BUFFER MEMORIES AND CONTROLLERS

CROSS-REFERENCE TO RELATED APPLICATIONS

A claim for priority under 35 U.S.C. § 119 is made to Korean Patent Application No. 10-2015-0113397 filed Aug. 11, 2015, in the Korean Intellectual Property Office, the entire contents of which are hereby incorporated by reference.

BACKGROUND

1. Field

Example embodiments of inventive concepts relate to semiconductor circuits, for example, operating methods of computing devices, which include storage devices. The storage devices may include nonvolatile memory devices, buffer memories, and controllers.

2. Description of Related Art

A storage device stores data transferred from an external host device. Typically, the storage device operates as a slave of the host device and may not perform operations other than operations for controlling the storage device.

A data center includes an application server, a database server, and a cache server. The application server may access the database server and the cache server in response to requests from external client devices. The database server and the cache server may be configured to store various data formats. The database server and/or the cache server may include a plurality of storage devices.

The processing speed and throughput of the data center may increase as network-based communication is extended. Conventionally, however, installation of additional application servers, database servers, and cache servers to accommodate these increases require relatively high additional costs.

SUMMARY

One or more example embodiments of inventive concepts provide methods of operating computing devices including storage devices. The storage devices may include nonvolatile memory devices, buffer memories; and controllers, which may improve processing speed and/or throughput.

At least one example embodiment of a storage device may include a non-volatile memory device, a buffer memory device and a controller. At least one example embodiment of a method may include: generating an application instance in the storage device based on a storage instance generated in the storage device; and executing the application instance using the storage device.

According to one or more example embodiments of inventive concepts, the method of operating a computing device may further comprise executing a power-on initialization at the storage device; loading a storage runtime in the storage device, the storage runtime including a plurality of fibers; loading firmware on at least one of the plurality of fibers, the firmware being configured to control at least one of memory operation at the storage device, the at least one memory operation including at least one of a writing, reading and erasing operating; and executing the firmware. The generation of the application instance may further comprise, for example, transferring a signature to the storage device; loading a binary module at the storage device, the binary module including an object class associated with the storage instance; and assigning a module identifier to the binary module. According to example embodiments of inventive concepts, the loading of the binary module may further comprise, for example, obtaining identifiers of binary modules from the storage device; and loading, from the storage device, the binary module corresponding to an identifier selected from the obtained identifiers. According to some example embodiments of inventive concepts, the method further comprises inputting the binary module to the storage device, and inputting the module identifier to the storage device.

According to example embodiments of inventive concepts, the generating application instance may further comprise, for example, generating an empty application instance, and assigning an application identifier to the empty application instance. The method may further comprise generating the storage instance in the storage device based on the binary module; registering the generated storage instance; and associating an object identifier with the generated application instance. The method may further comprise probing the storage instance to determine a validity of the generated storage instance.

According to example embodiments of inventive concepts, the method may further comprise, connecting two or more storage instances in the generated application instance. The connecting of the two or more storage instances comprises connecting an output port of a first of the two or more storage instances with an input port of a second of the two or more storage instances.

According to example embodiments of inventive concepts, the connecting of the two or more storage instances may comprise generating a queue between the output port of the first of the two or more storage instances and the input port of the second of the two or more storage instances. According to some example embodiments, the method further comprising connecting at least one of the two or more storage instances to a host device based on a request received from the host device; and communicating between the host device and the at least one of the two or more storage instances based on a serialized packet. According to some example embodiments, the method further comprises generating, by a host device, a file to be stored in a nonvolatile memory device, and accessing the generated file through application instance.

According to one or more embodiments of inventive concepts is directed towards a method of operating a computing device, which may include generating an application instance in the storage device based on a storage instance generated in the storage device, executing the application instance using the storage device, receiving a range of logical addresses to the application instance, and accessing, by the application instance, a nonvolatile memory device based on the transferred range of the logical addresses.

According to example embodiments of inventive concepts, a method of operating a computing device is disclosed. The method may comprise receiving, at a storage device, a request to execute an application instance at the storage device, the application instance including a plurality of storage instances connected with one another, at least a first of the plurality of storage instances connected to a host device; and executing the application instance at the storage device in response to the received request.

The method may further comprise receiving a range of logical addresses at the application accessing, by the application instance, a nonvolatile memory device at the storage device based on the received range of the logical addresses; and connecting the plurality of storage instances with one another. The storage device may include a flash memory device, the flash memory device including a three-dimensional memory array. The three-dimensional memory array may include a non-volatile memory that is monolithically formed in one or more physical levels of memory cells having active areas above a silicon substrate. In the three-dimensional memory array may include at least one of word lines and bit lines, wherein the word lines and the bit lines are shared between physical levels of the three-dimensional memory array. The three-dimensional memory array may further include a plurality of memory cells, at least one of the plurality of memory cells including a charge trap layer.

BRIEF DESCRIPTION OF THE FIGURES

Inventive concepts will become apparent from the following description of non-limiting example embodiments with reference to the following figures, wherein like reference numerals refer to like parts throughout the various figures unless otherwise specified. The drawings are not necessarily to scale, emphasis instead being placed upon illustrating the principles of inventive concepts. In the drawings.

DETAILED DESCRIPTION

Figure 1:
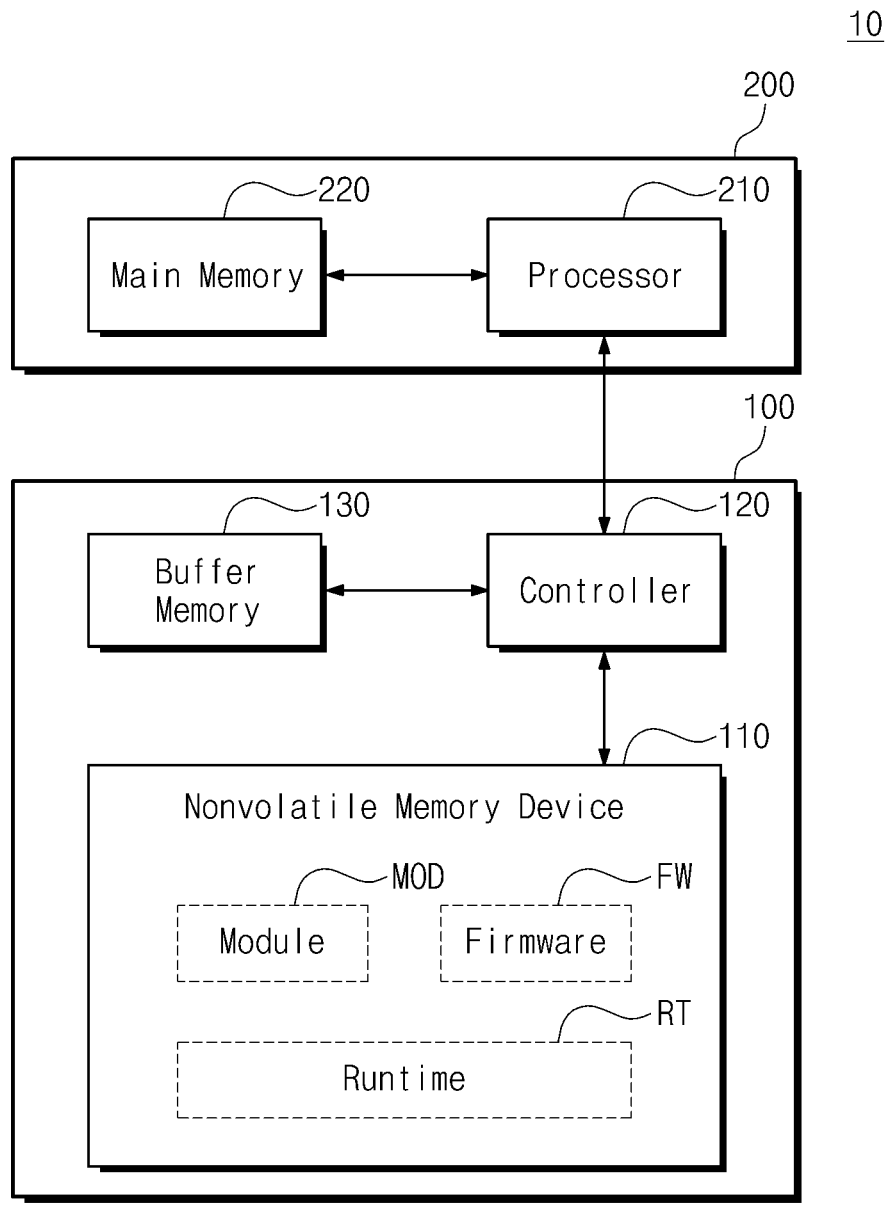
FIG. 1 is a block diagram illustrating a computing device according to example embodiment of inventive concepts.

Below, example embodiments of inventive concepts will be described with reference to accompanying drawings for detailed description to the extent that one skilled in the art easily implements the scope and spirit of inventive concepts. Example embodiments, may, however, be embodied in many different forms and should not be construed as being limited to the embodiments set forth herein; rather, these example embodiments are provided so that this disclosure will be thorough and complete, and will fully convey the scope of example embodiments of inventive concepts to those of ordinary skill in the art.

Some terms may be defined for descriptive convenience of inventive concepts. A class may refer to a program-code template which is used to generate instances with different characteristics. In general, the class may be interpreted as being associated with an object. An application class may be interpreted, in general, as being associated with an application. In some cases, however, the class may be interpreted as being associated with an application or an object. The application may be made by organizing one or more objects.

A storage class or a storage application class may be designed to fit storage devices and may refer to a program-code-template which is driven on the storage device. The storage class or the storage application class may also be designed to fit host devices and may refer to a program-code-template which is driven on the host devices.

An instance may be generated from a class. A plurality of instances may be generated from one class. Instances generated from one class may be different from each other in terms of a characteristic, a variable, a function, or the like. An instance may operate in real time and may function according to features inherited from a class or according to features inputted through an argument.

Particular structural or functional descriptions for example embodiments disclosed in this specification are only for the purpose of description of embodiments of inventive concepts. Example embodiments of inventive concepts may be variously modified in form and are not limited to the example embodiments in this specification.

While inventive concepts are susceptible to various modifications and alternative forms, specific example embodiments thereof are shown by way of example in the drawings and will herein be described in detail. It should be understood, however, that there is no intent to limit inventive concepts to the particular forms disclosed, but on the contrary, inventive concepts are to cover all modifications, equivalents, and alternatives falling within the spirit and scope of inventive concepts.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion, that is, "between" versus "directly between," adjacent" versus "directly adjacent," etc.

The terminology used herein is for the purpose of describing particular embodiments only and is not intended to be limiting of inventive concepts. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein are to be interpreted as is customary in the art to which these inventive concepts belong. It will be further understood that terms in common usage should also be interpreted as is customary in the relevant art and not in an idealized or overly formal sense unless expressly so defined herein.

In example embodiments, a nonvolatile memory may be embodied to include a three dimensional (3D) memory array. The 3D memory array may be monolithically formed on a substrate (e.g., semiconductor substrate such as silicon, or semiconductor-on-insulator substrate). The 3D memory array may include two or more physical levels of memory cells having an active area disposed above the substrate and circuitry associated with the operation of those memory cells, whether such associated circuitry is above or within such substrate. The layers of each level of the array may be directly deposited on the layers of each underlying level of the array.

In example embodiments, the 3D memory array may include vertical NAND strings that are vertically oriented such that at least one memory cell is located over another memory cell. The at least one memory cell may comprise a charge trap layer.

The following patent documents, which are hereby incorporated by reference in their entirety, describe suitable configurations for three-dimensional memory arrays, in which the three-dimensional memory array is configured as a plurality of levels, with word lines and/or bit lines shared between levels: U.S. Pat. Nos. 7,679,133; 8,553,466; 8,654,587; 8,559,235; and US Pat. Pub. No. 2011/0233648.

It will be apparent to those skilled in the art that various modifications and variations can be made to the non-limiting example embodiments without departing from the spirit or scope of inventive concepts described herein. Thus, it is intended that the example embodiments cover the modifications and variations of the example embodiments provided they come within the scope of the appended claims and their equivalents.

Hereinafter, example embodiments of inventive concepts will be described with reference to the accompanying drawings.

FIG. 1 is a block diagram illustrating a computing device 10 according to an example embodiment of inventive concepts. Referring to FIG. 1, the computing device 10 may include a storage device 100 and a host device 200.

The storage device 100 may store data under control of the host device 200. For example, the storage device 100 may perform writing, reading, and erasing under control of the host device 200. Furthermore, the storage device 100 may drive an application under control of the host device 200. For example, the storage device 100 may drive at least one storage application instance including at least one storage instance under control of the host device 200. The storage device 100 may perform a task requested by the host device 200, based on the storage application instance. That is, for example, the storage device 100 may divide up, and process, a task load requested by the host device 200.

The host device 200 may access the storage device 100. The host device 200 may control the storage device 100 so as to generate a storage application instance. For example, the host device 200 may drive a host application instance associated with the storage device 100. The host application instance may operate in conjunction with the storage application instance. The host application instance may allocate or allot a task to the storage application instance and may receive a result of the task from the storage application instance. That is, for example, the host device 200 may divide a task load up with the storage device 100 through the host application instance and the storage application instance. As discussed below, the host device 200 may be interpreted as being the host device 200 itself, or a host application instance executed on the host device 200.

The storage device 100 may include a nonvolatile memory device 110, a controller 120, and a buffer memory 130. The nonvolatile memory device 110 may store a storage runtime RT, firmware FW, and a module MOD.

The storage runtime RT may be loaded by the controller 120 to manage the storage device 100. For example, the storage runtime RT may be loaded by the controller 120 into the buffer memory 130 or an internal memory of the controller 120. The loaded storage runtime RT may be executed by the controller 120. The storage runtime RT may manage a resource of the storage device 100, and may manage a thread.

The firmware FW may be loaded by the controller 120 and may manage an access to the nonvolatile memory device 110. For example, the firmware FW may be loaded by the controller 120 into the buffer memory 130 or the internal memory of the controller 120. The loaded firmware FW may be executed by the controller 120. The firmware FW may control writing, reading, and/or erasing of the nonvolatile memory device 110. The firmware FW may manage a write policy, a read policy, and an erase policy for the nonvolatile memory device 110. The firmware FW may control background operations for managing the nonvolatile memory device 110 such as garbage collection, wear leveling, and the like.

The module MOD may be loaded by the memory controller 120 and may provide a class. For example, the module MOD may include a binary module, which includes a storage class or a storage application class. In at least one example embodiment, the nonvolatile memory device 110 may include two or more modules.

The nonvolatile memory device 110 may perform wilting, reading and/or erasing under control of the controller 120. The nonvolatile memory device 110 may receive a command and an address from the controller 120 through an input/output channel. The nonvolatile memory device 110 may exchange data with the controller 120 through the input/output channel.

The nonvolatile memory device 110 may exchange a control signal with the controller 120 through a control channel. In at least one example embodiment, the nonvolatile memory device 110 may receive, from the controller 120, at least one of a chip enable signal /CE for selecting at least one of a plurality of nonvolatile memory chips in the nonvolatile memory device 110, a command latch enable signal CLE indicating that a signal received from the controller 120 through the input/output channel is the command, an address latch enable signal ALE indicating that a signal received from the controller 120 through the input/output channel is an address, a read enable signal /RE generated by the controller 120 at a read operation, periodically toggled, and used to tune timing, a write enable signal /WE activated by the controller 120 when the command or the address is transmitted, a write protection signal /WP activated by the controller 120 to suppress and/or prevent unintended writing or erasing when power changes, and a data strobe signal DQS used to adjust input synchronization about the data transmitted through the input/output channel and generated from the controller 120 at a write operation so as to be periodically toggled. For example, in at least one example embodiment, the nonvolatile memory device 110 may output, to the controller 120, at least one of a ready/busy signal R/nB indicating whether the nonvolatile memory device 110 is performing a program, erase or read operation and a data strobe signal DQS used to adjust output synchronization about the data and generated from the read enable signal /RE by the nonvolatile memory device 110 so as to be periodically toggled.

The nonvolatile memory device 110 may include a flash memory. However, inventive concepts should not be limited thereto. For example, the nonvolatile memory device 110 may incorporate at least one of nonvolatile memory devices including, but not limited to, a phase-change random access memory (RAM) (PRAM), a magnetic RAM (MRAM), a resistive RAM (RRAM), a ferroelectric RAM (FeRAM), and the like.

The memory controller 120 may be configured to access the nonvolatile memory device 110. For example, the controller 120 may control the nonvolatile memory device 110 through an input/output channel and a control channel so as to perform a write, read and/or erase operation.

In at least one example embodiment, the controller 120 may control the nonvolatile memory device 110 in response to control of an external host device not illustrated). For example, the controller 120 may communicate with the external host device based on a format different from the format of communications with the nonvolatile memory device 110. A unit of data which the controller 120 conveys to the nonvolatile memory device 110 may be different from a unit of data which the controller 120 conveys to the external host device.

The buffer memory 130 may include at least one of a variety of random access memories, including, but not limited to, a static RAM (SRAM), a dynamic RAM (DRAM), a synchronous DRAM (SRAM), a PRAM, a magneto-resistive RAM (MRAM), a resistive RAM (RRAM), a ferroelectric RAM (FRAM), and the like.

The nonvolatile memory device 110 may include a plurality of nonvolatile memory chips. In at least one example embodiment, the controller 120 and the nonvolatile memory chips may be interconnected based on a channel and a way. One channel may include one data channel and one control channel. One data channel may include eight data lines. One control channel may include control lines for transferring the chip enable signal /CE, the command latch enable signal CLE, the address latch enable signal ALE, the read enable signal /RE, the write enable signal /WE, the write protect signal /WP, and/or the ready/busy signal R/nB.

Nonvolatile memory chips connected to one channel may constitute a way. When connected to one channel, n nonvolatile memory chips may compose an n-way. Nonvolatile memory chips belonging to one way may share data lines and control lines for transferring the command latch enable signal CLE, the address latch enable signal ALE, the read enable signal /RE, the write enable signal /WE, and the write protect signal /WP. Each of the nonvolatile memory chips belonging to one way may communicate with the controller 120 through dedicated control lines for the chip enable signal /CE and the ready/busy signal R/nB.

In at least one example embodiment, the controller 120 may alternately access n-way nonvolatile memory chips connected to one channel. The controller 120 may independently access the nonvolatile memory chips connected with different channels. The controller 120 may alternately and/or simultaneously access the nonvolatile memory chips connected with different channels.

In at least one example embodiment, the nonvolatile memory chips may be connected with the controller 120 in the form of a relatively wide input/output (IO). For example, the nonvolatile memory chips connected to the different channels may share a control line for a chip enable signal /CE. The nonvolatile memory chips that share the control line for the chip enable signal /CE may be accessed at the same or substantially the same time. Data lines of different channels may be used at the same or substantially the same time, and thus, a wider input/output bandwidth may be achieved.

In at least one example embodiment, the storage device 100 may include a solid state drive (SSD) and/or a hard disk drive (HDD). The storage device 100 may include memory cards, including, but not limited to, PC card (personal computer memory card international association (PCM-CIA)), compact flash (CF) card, smart media card (SM, SMC), memory stick, multimedia card (MMC, RS-MMC, MMCmicro), secure digital (SD) card (SD, miniSD, microSD, SDHC), universal serial bus (USB) memory card, universal flash storage (UFS), and the like. The storage device 100 may include embedded memories, including, but not limited to, embedded MultiMedia card (eMMC), UFS, and PPN (Perfect Page NAND).

The host device 200 may include a processor 210 and a main memory space 220. The processor 210 may manage resources of the computing device 10, and may control an overall operation of the computing device 10. The processor 210 may execute an operating system of the host device 200 and various host application instances. The processor 210 may use the main memory 220 as a working memory for executing various functions.

The computing device 10 is not limited to, a server rack, a server board, a server box, or the like mounted on an application server, a database server, or a cache server.

Figure 2:
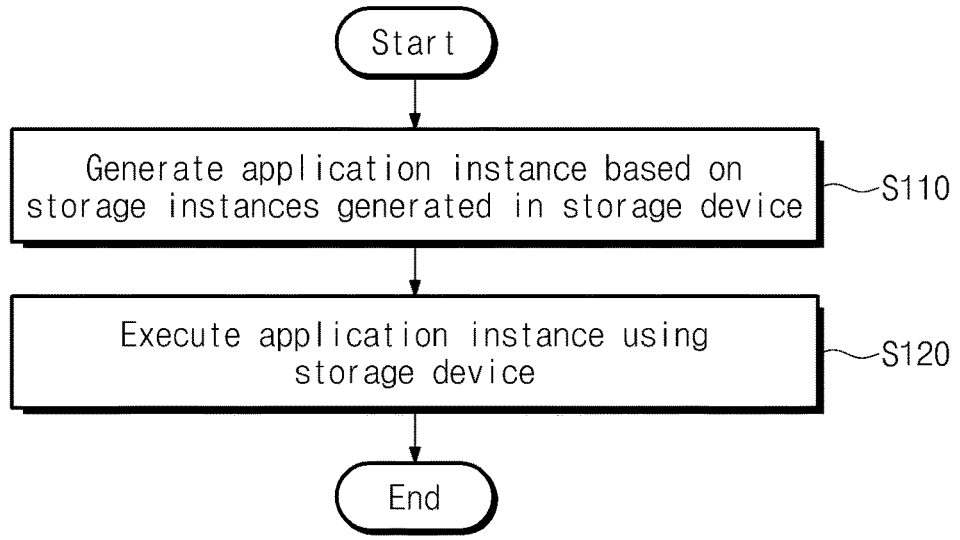
FIG. 2 is a flow chart illustrating an operating method of a computing device according to an example embodiment of inventive concepts.

FIG. 2 is a flow chart schematically illustrating an operating method of a computing device 10 according to an example embodiment of inventive concepts.

Referring to FIGS. 1 and 2, at S110, the storage device 100 may be configured to generate an application instance (or a storage application instance) based on storage instances generated in the storage device 100.

At S120, the application instance (or the storage application instance) may be executed using the storage device 100.

Under control of the host device 200, the storage device 100 may organize storage instances to drive the application instance (or the storage application instance). That is, for example, the storage device 100 may divide up the task load of the host device 200 through the application instance (or the storage application instance).

Figure 3:
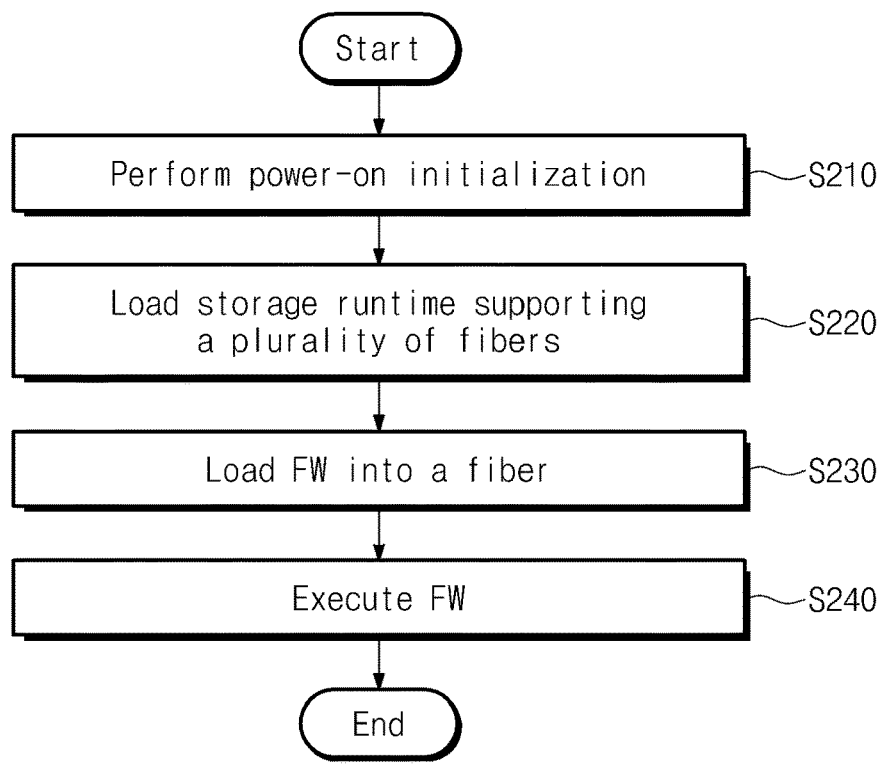
FIG. 3 is a flow chart illustrating a method for initializing a storage device according to an example embodiment.

FIG. 3 is a flow chart illustrating a method for initializing a storage device 100 according to an example embodiment. Referring to FIGS. 1 and 3, at S210, the storage device 100 may be configured to be initialized upon powering-on the storage device 100. For example, various registers in the storage device 100 may be set with initialization values, and/or various components in the storage device 100 may be tested and/or checked.

At S220, a storage runtime RT supporting a plurality of fibers may be loaded. For example, the controller 120 may load and execute the storage runtime RT into the nonvolatile memory device 110. The storage runtime RT may support a plurality of fibers. The fiber may be a kind of thread and may have a simplified form in which a location of context switching is fixed. For example, the fiber may be a unit of tasks which are processed in parallel (e.g. simultaneously). However, the storage runtime RT according to at least one example embodiment of inventive concepts may not be limited to support a fiber. The storage runtime RT may support a thread supporting real-time context switching.

At S230, firmware FW may be loaded onto a fiber of the storage runtime RT, which is driven on the storage device 100. The controller 120 may read the firmware FW from the nonvolatile memory device 120 and may load the read firmware FW onto one of a plurality of fibers of the storage runtime RT.

At S240, the loaded firmware FW may be executed according to control of the storage runtime RT. As discussed below, the host device 200 may be interpreted as being the host device 200 itself, or the storage runtime RT executed on the host device 200.

Figure 4:
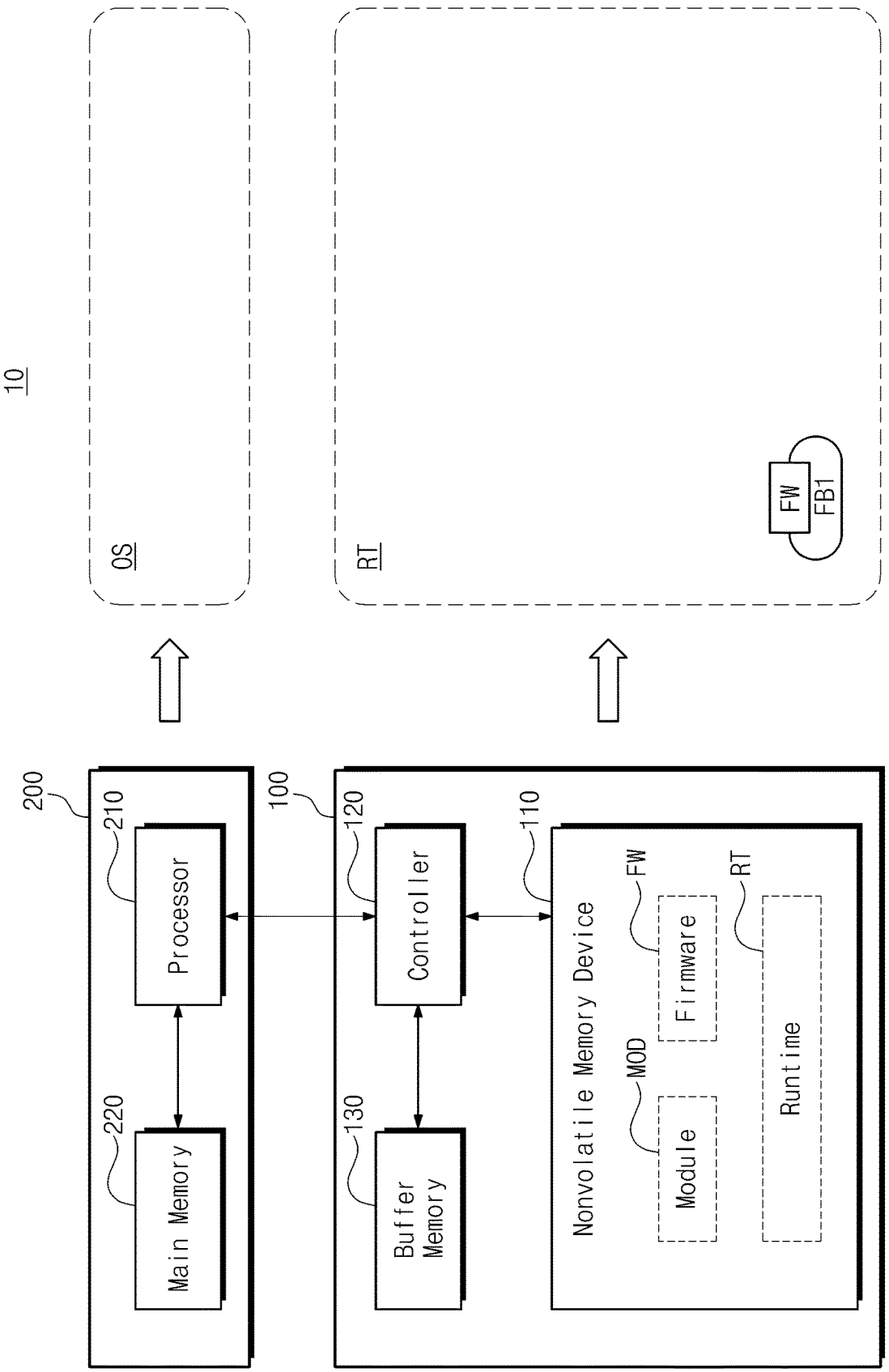
FIG. 4 is a block diagram illustrating examples of logical areas of a storage device when the initialization method of FIG. 3 is performed.

FIG. 4 is a block diagram illustrating example logical areas of a storage device 100 when the initialization method of FIG. 3 is performed.

FIG. 4 illustrates an area of the storage runtime RT that corresponds to the storage device 100, and an area of an operating system (OS) that corresponds to the host device 200.

In the area of the storage runtime RT, the firmware FW may be loaded onto a first fiber FB1. The firmware FW may control an access policy and a management policy for the nonvolatile memory device 110 under control of the storage runtime RT.

Figure 5:
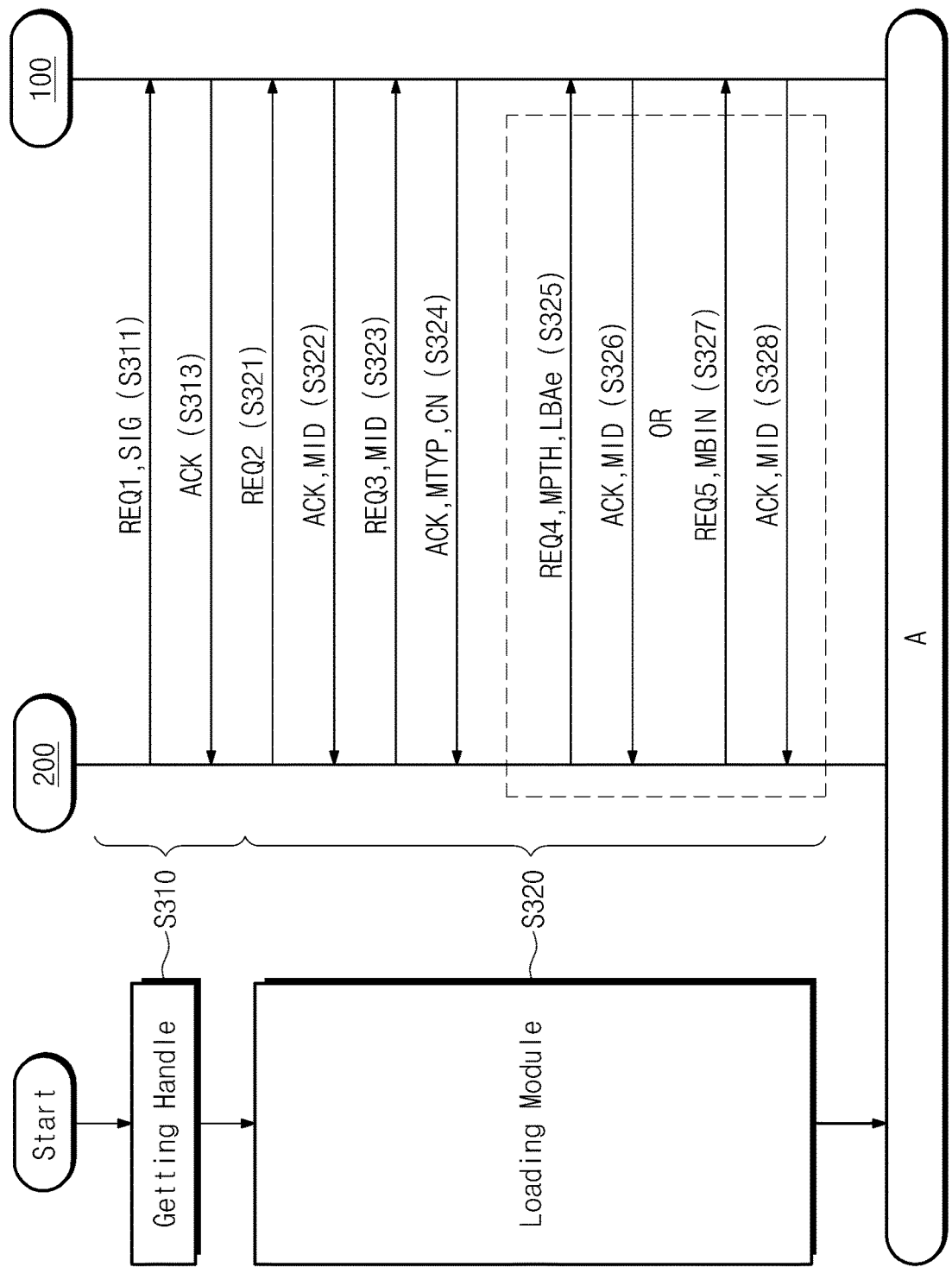
FIG. 5 is a flow chart and a corresponding signal flow diagram illustrating example embodiments of methods for generating an application instance based on storage instances generated in the storage device.

FIG. 5 is a flow chart and corresponding signal flow diagram illustrating an example embodiment of method for generating an application instance based on storage instances generated in storage device see FIG. 2, S110).

Figure 6:
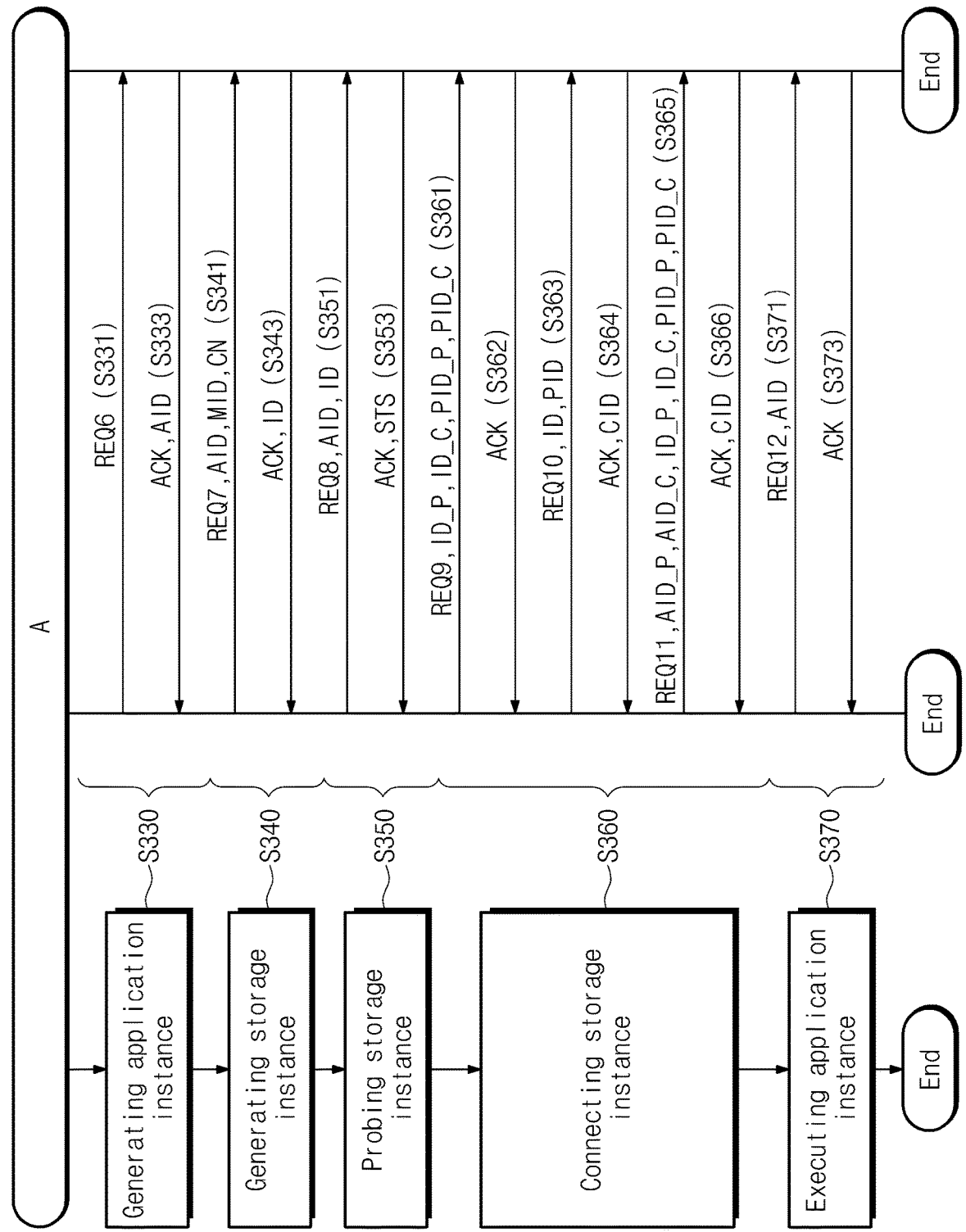
FIG. 6 is a flow chart and a corresponding signal flow diagram illustrating example embodiments of methods for executing an application instance in a storage device after the storage device is initialized.

FIG. 6 is a flow chart and corresponding signal flow diagram illustrating a method for executing an application instance in a storage device 100 after the storage device 100 is initialized (see FIG. 2, S120).

Referring to FIGS. 4 and 5, at S310, the host device 200 may get a handle of the storage device 100. As shown in signal flow diagram in FIG. 5, S310 may include S311 and S313. At S311, the host device 200 may transmit a signature SIG and a first request REQ1 requesting a handle to the storage device 100. When the signature SIG corresponds to a given (or, alternatively, desired, or predetermined) value or pattern, or the storage device 100 succeeds in authentication using the signature SIG, as noted in S313, the storage device 100 may provide the host device 200 with acknowledge ACK allowing the handle of the storage device 100.

At S320, the storage device 100 may load a module MOD in the storage device 100 under control of the host device 200. For example, the storage device 100 may load the module MOD, which includes a storage class that corresponds to a storage instance that is to be generated. As shown in the signal flow diagram in FIG. 5, S320 may include S321 through S328.

At S321, the host device 200 may transmit to the storage device 100 a second request REQ2, requesting a list of modules MODs stored in the nonvolatile memory device 110.

At S322, the storage device 100 may transfer to the host device 200 the acknowledge ACK and/or module identifiers MID of the modules MODs. The module identifiers MID of the modules MODs are stored in the nonvolatile memory device 110.

At S323, the host device 200 may transfer a third request REQ3 to the storage device 100. The third request REQ3 requests information about the module MOD with the selected module identifiers MID.

At S324, the storage device 100 may transfer to the host device 200 the acknowledge ACK, a module type MTYP corresponding to the selected module identifiers MID, and/or class names CN of classes included in the module MOD. The class names CN correspond to the selected module identifiers MID. For example, S323 and S324 may repeat sequential selection of module identifiers MID until a module or classes, which the host device 200 needs, are detected.

Still referring to FIGS. 5, S325 and S326 may be performed when the module MOD that the host device 200 requires, or the module MOD which includes classes that the host device 200 requires, is stored in the nonvolatile memory device 110.

At S325, the host device 200 may transfer to the storage device 100 a fourth request REQ4 requesting loading of the module MOD, a module path MPTH that indicates a path (e.g., a folder) where the module MOD is stored, and/or a logical address range LBAe where the module MOD is stored.

At S326, the storage device 100 may load the module MOD, and may transfer an acknowledge ACK and a module identifier MID of the loaded module to the host device 200.

In FIGS. 5, S327 and S328 may be performed in the case where the module MOD that the host device 200 requires, or the module MOD which includes classes that the host device 200 requires, is not stored in the nonvolatile memory device 110.

At S327, the host device 200 may transmit to the storage device 100 a fifth request REQ5 requesting loading of a module MOD and a module binary data MBIN of the module MOD.

At S328, the storage device 100 may load the module binary data MBIN onto a new module, and may transfer a module identifier MID of the loaded module to the host device 200.

FIG. 6 is a flow chart and corresponding signal flow diagram illustrating a method for executing an application instance in a storage device 100 after the storage device 100 is initialized (see FIG. 2, S120).

Referring to FIGS. 4 and 6, at S330, an application instance (or a storage application instance) may be generated in the storage device 100. As shown in the signal flow diagram in FIG. 6, S330 may include S331 and S333.

At S331, the host device 200 may transfer to the storage device 100 a sixth request REQ6, requesting generation of the application instance.

At S333, the storage device 100 may generate the application instance based on an application class, and may transfer an application identifier AID of the application instance to the host device 200 with the acknowledge ACK.

Figure 7:
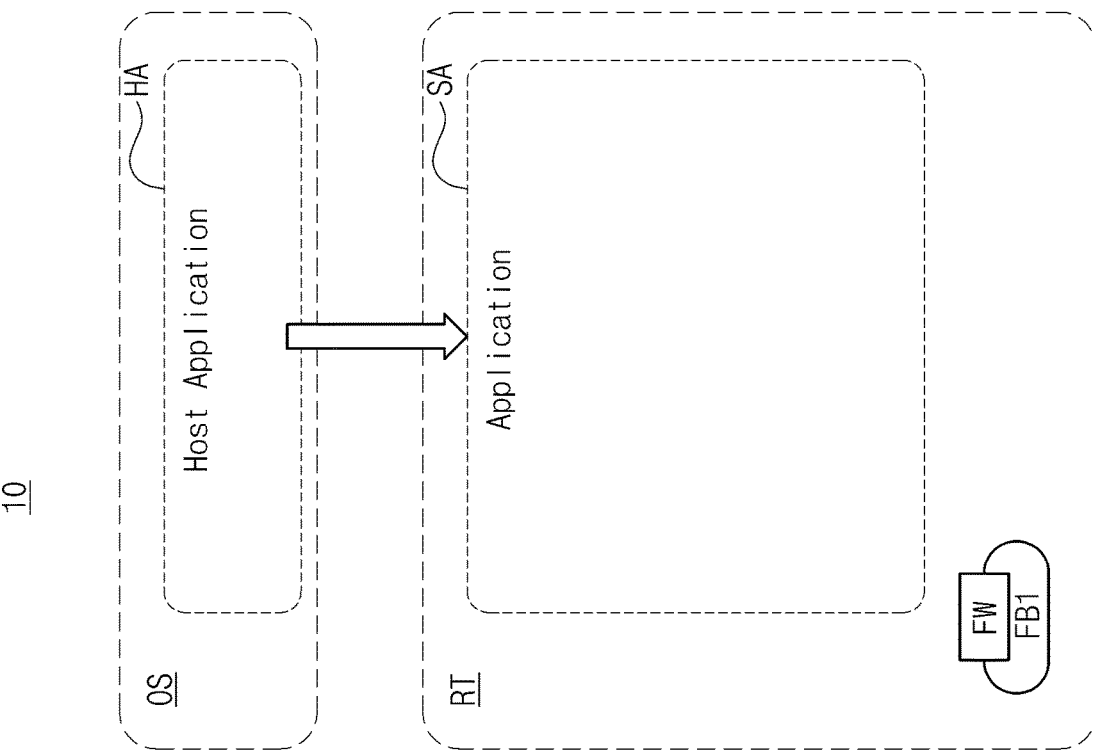
FIGS. 7 to 9 show an example procedure in which an application instance is generated on a storage device based on the methods of FIGS. 5 and 6.

FIG. 7 illustrates an example embodiment in which an application instance is generated in the storage device 100.

Referring to FIG. 7, based on a request of a host application instance HA in the host device 200, an application instance SA may be generated at an area of the storage runtime RT of the storage device 100. The host application instance (HA) is executed at an area of an operating system (OS) of the host device 200. In at least one example embodiment, the generated application instance SA may be at an empty state.

Referring now to FIGS. 6 and 7, at S340, a storage instance may be generated in the storage device 100. In more detail with respect to S340, at S341, the host device 200 may transfer to the storage device 100 a seventh request REQ7 requesting generation of the storage instance, an application identifier AID of an application instance to which a storage instance belongs, a module identifier MID of a module MOD in which a storage class corresponding to the storage instance is included, and a class name CN of a storage class corresponding to a storage instance. In at least one example embodiment, the host device 200 may further transfer to the storage device 100 information about the size of a heap or a stack to be allotted to a storage instance. The host device 200 may further transfer to the storage device 100 an argument adjusting a characteristic of the storage instance.

At S343, the storage device 100 may generate the storage instance and may transfer an instance identifier ID of the storage instance to the host device 200. In at least one example embodiment, S340 may be repeated two or more times in the case where two or more storage instances are generated.

Figure 8:
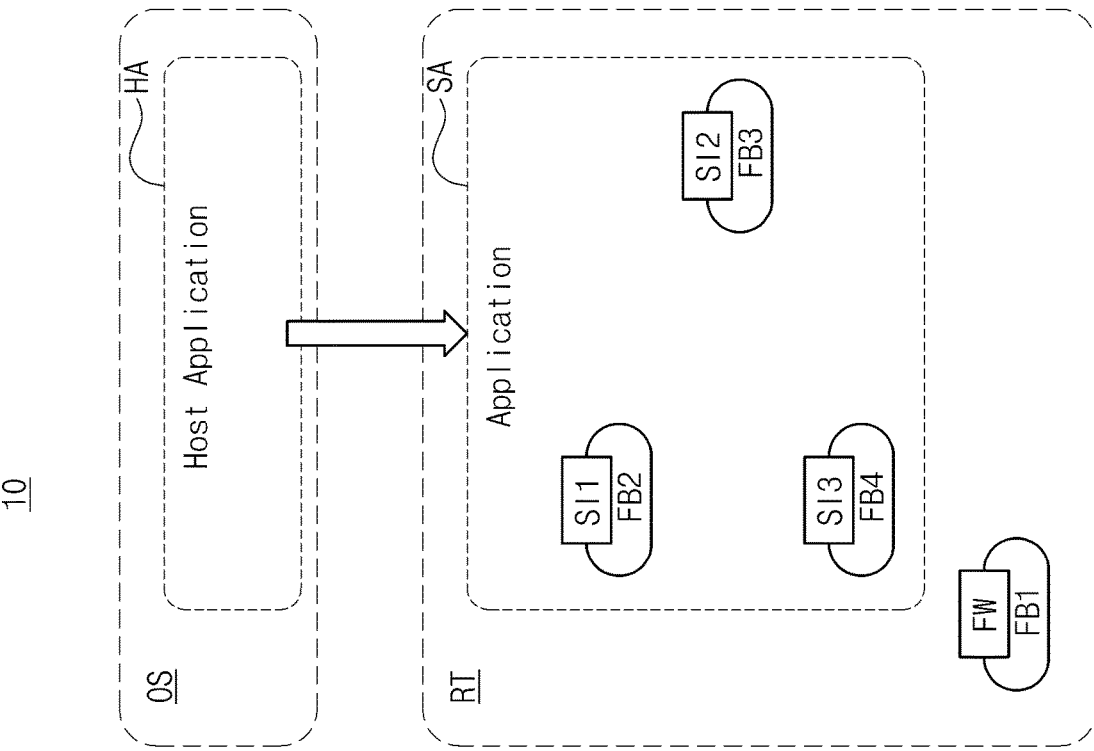

FIG. 8 illustrates an example in which a storage instance is generated in the storage device 100.

Referring to FIG. 8, a first storage instance SI1 may be generated and registered at a second fiber FB2 of the storage runtime RT. A second storage instance SI2 may be generated and registered at a third fiber FB3 of the storage runtime RT. A third storage instance SI3 may be generated and registered at a fourth fiber FB4 of the storage runtime RT.

Referring now to FIGS. 6 and 8, at S350, the generated storage instance may be probed. In more detail with respect to S350 in FIG. 6, at S351, the host device 200 may transfer to the storage device 100 an eighth request REQ8 requesting probing, an application identifier AID of an application instance corresponding to a probing target, and an instance identifier ID of a storage instance corresponding to the probing target.

At S353, the storage device 100 may perform probing, and may transfer status information STS of the storage instance to the host device 200. In at least one example embodiment, the host application instance HA may support exception handling of "C+", or a similar scheme thereto. At this time, validity of the generated storage instance may be automatically probed by try-catch error handling and/or algorithm similar thereto.

At S360, storage instances SI1 to SI3 may be connected to each other in the storage device 100. As shown in the signal flow diagram in FIG. 6, S360 may include S361 through S366.

In FIGS. 6, S361 and S362 show an example in which storage instances SI1 to SI3 are connected to each other.

At S361, the host device 200 may transfer to the storage device 100 a ninth request REQ9, requesting a connection of the storage instances SI1 to SI3, a constructor instance identifier ID_P, a consumer instance identifier ID_C receiving data through an input port, an output port identifier PID_P of a constructor instance, and an input port identifier PID_C of a consumer instance.

At S362, the storage device 100 may transfer an acknowledge ACK to the host device 200. Furthermore, the storage device 100 may connect (i) an output port corresponding to the constructor instance identifier ID_P, (ii) the output port identifier PID_P with an input port corresponding to the consumer instance identifier ID_C, and (di) the input port identifier PID_C of the consumer instance. The connected input and output ports may have the same data type. In at least one example embodiment, M constructor instances may be connected with N consumer instances. M output ports may be connected with N input ports. M may be an integer greater than "0", and N may be an integer greater than "0".

In an example embodiment, each output port may have a first-out manner or a division manner. With the first-out manner, when an input port retrieves data held at an output port, the output port may hold next data. With the division manner, data held at an output port may be maintained until the held data is retrieved by all input ports. A data transfer manner between an output port and an input port may be variously changed and/or modified without being limited to the above description.

Still referring to FIGS. 6, S363 and S364 show an example in which a storage instance SI in the storage device 100 and a host application instance HA in the host device 200 are connected to each other.

At S363, the host device 200 may transfer to the storage device 100 a tenth request REQ10 requesting a connection with the host device 200; that is, for example, a connection between an instance identifier ID of a storage instance with the host device 200, and a port identifier PID of a storage instance.

At S364, the storage device 100 may assign a channel identifier CID to a port of a storage instance connected with the host device 200, and may transfer an acknowledge ACK. Furthermore, at S364, the storage device 100 may assign a channel identifier CID to the host device 200. As described above, storage instances and application instance (or the storage application instance) may be connected to have a relation of M to N.

In FIG. 6, S365 and S366 show an example in which a first application instance is connected to a second application instance when a plurality of application instances (or storage application instances) exist.

At S365, the host device 200 may transfer to the storage device 100 an eleventh request REQ11, requesting a connection between the plurality of application instances, an application identifier AID_P of a constructor application outputting data, an application identifier AID_C of a consumer application instance receiving data, an instance identifier ID_P of a constructor instance of a constructor application instance outputting data, an instance identifier ID_C of a consumer instance of a consumer application instance receiving data, an output port identifier PID_P of a constructor instance, and an input port identifier PID_C of a consumer instance. The storage device 100 may establish a channel between the plurality of application instances and a channel identifier CID.

At S366, the storage device 100 may transfer to the host device 200 an acknowledge ACK and a channel identifier CID. As described above, the storage instances SI1 to SI3 and the plurality of application instances may be connected to have a relation of M to N.

Figure 9:
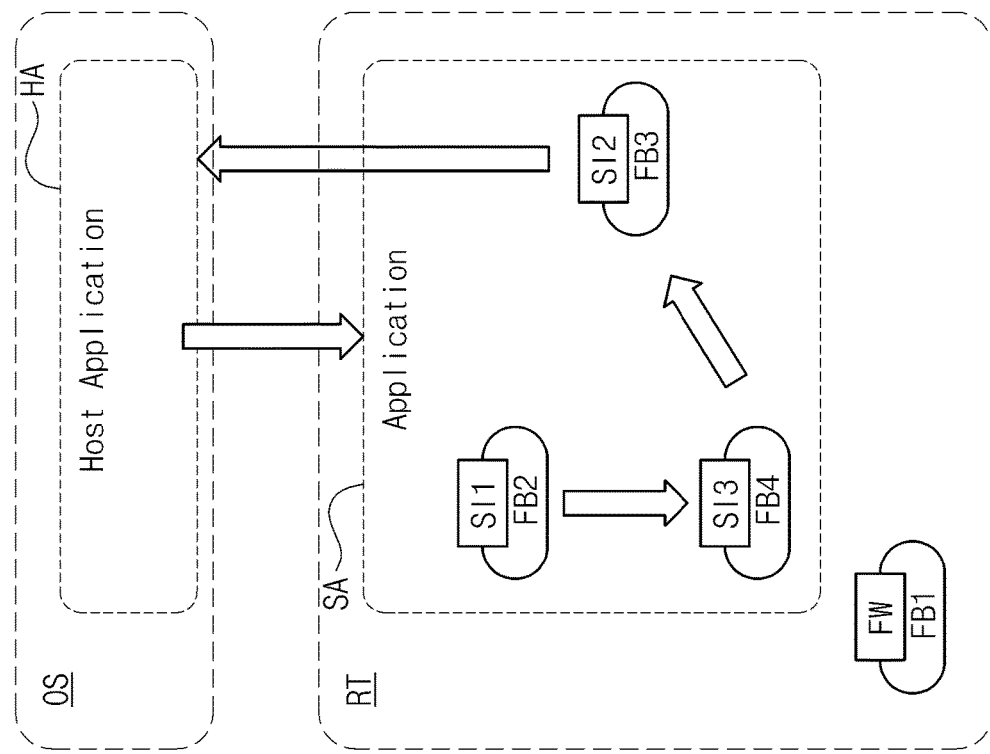
Figure 9:
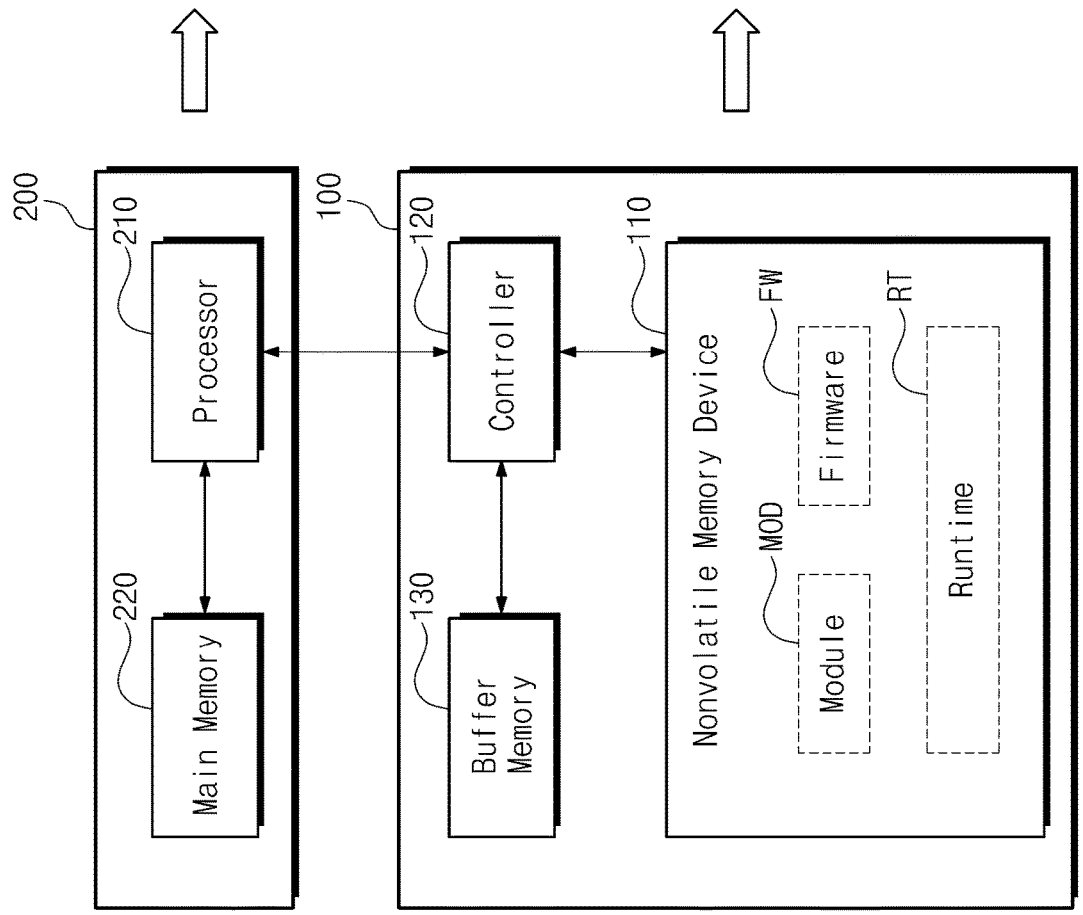

FIG. 9 illustrates an example embodiment in which the storage instances SI1 to SI3 are connected.

Referring to FIG. 9, an output port of a first storage instance SI1 may be connected with an input port of a third storage instance SI3. An output port of the third storage instance SI3 may be connected with an input port of a second storage instance SI2. An output port of the second storage instance SI2 may be connected with an input port of a host application instance HA. In an example embodiment, the input port of the first storage instance SI1 may be connected with a file management instance (not shown), which reads data from the nonvolatile memory device 110 or the buffer memory 130. That is, for example, the first storage instance SI1 may receive, as an input, data read from the nonvolatile memory device 110 or the buffer memory 130.

Referring now to FIGS. 6 and 9, at S370, the generated storage instances SI1 to SI3 may be executed. In FIG. 6, S370 may correspond to S210 of FIG. 2, and S370 may include S371 and S373.

At S371, the host device 200 may transfer to the storage device 100 a twelfth request REQ12 requesting execution of an application instance and an application identifier AID.

At S373, the storage device 100 may transfer to the host device 200 an acknowledge ACK and execute an application instance in the storage device 100.

In an example embodiment, the first storage instance SI1 may be a mapper, which may be configured to: (1) read text data stored in the nonvolatile memory device 110 or the buffer memory 130, by a unit of a line, (2) take words in each line apart, (3) insert a token of "1" into each word, and (4) output word and token pairs. The third storage instance SI3 may be a shuffler, which is configured to group pairs, having the same word, from among word and token pairs, and output pair groups. Each group may include a word and tokens of grouped pairs. The second storage instance SI2 may be a reducer, which is configured to calculate a sum of tokens in each group, and output pairs of a word and the calculated sum. That is, for example, the application instance SA may operate as a word counter. The application instance SA may count events when each word is used in a file, or an address range, designated by the host application instance HA.

As described above, if the storage runtime RT and the storage instances SI1 to SI3 are driven in the storage device 100, then the storage device 100 may perform a task organized by the application instance SA, and thus, the storage device may divide up a task load.

In an example embodiment, an access to the application instance may be blocked while the application instance performs a task. For example, if the host device 200 transfers to the storage device 100 an application identifier and a request, then the storage device 100 in response may transfer to the host device 200 an acknowledge ACK and a code indicating that a corresponding application instance is performing a task.

In an example embodiment, in the case where the host device 200 calls a destructor of an application instance, the application instance may be terminated regardless of whether it is performing a task.

In an example embodiment, the host device 200 may unload each of the storage instances SI1 to SI3 from the application instance SA by transferring to the storage device 100 an unload request and an instance identifier of the storage instances SI1 to SI3.

For purposes of descriptive convenience, but not for limiting example embodiments of inventive concepts, it may be assumed that one application instance SA is generated in the storage device by the host device 200. However, the number of application instances generated in the storage device 100 should not be limited thereto. For example, a plurality of application instances may be generated in the storage device 100 by the host device 200, and the plurality of application instances may be loaded onto a plurality of fibers FB1 to FBk. The plurality of application instances may be processed in parallel and/or simultaneously based on multi-threading.

In an example embodiment, a plurality of application instances may be generated in the storage device 100 by two or more host devices. That is, for example, the storage device 100 may support a function to generate multiple application instances based on requests of multi-users or multiple host devices.

Figure 10:
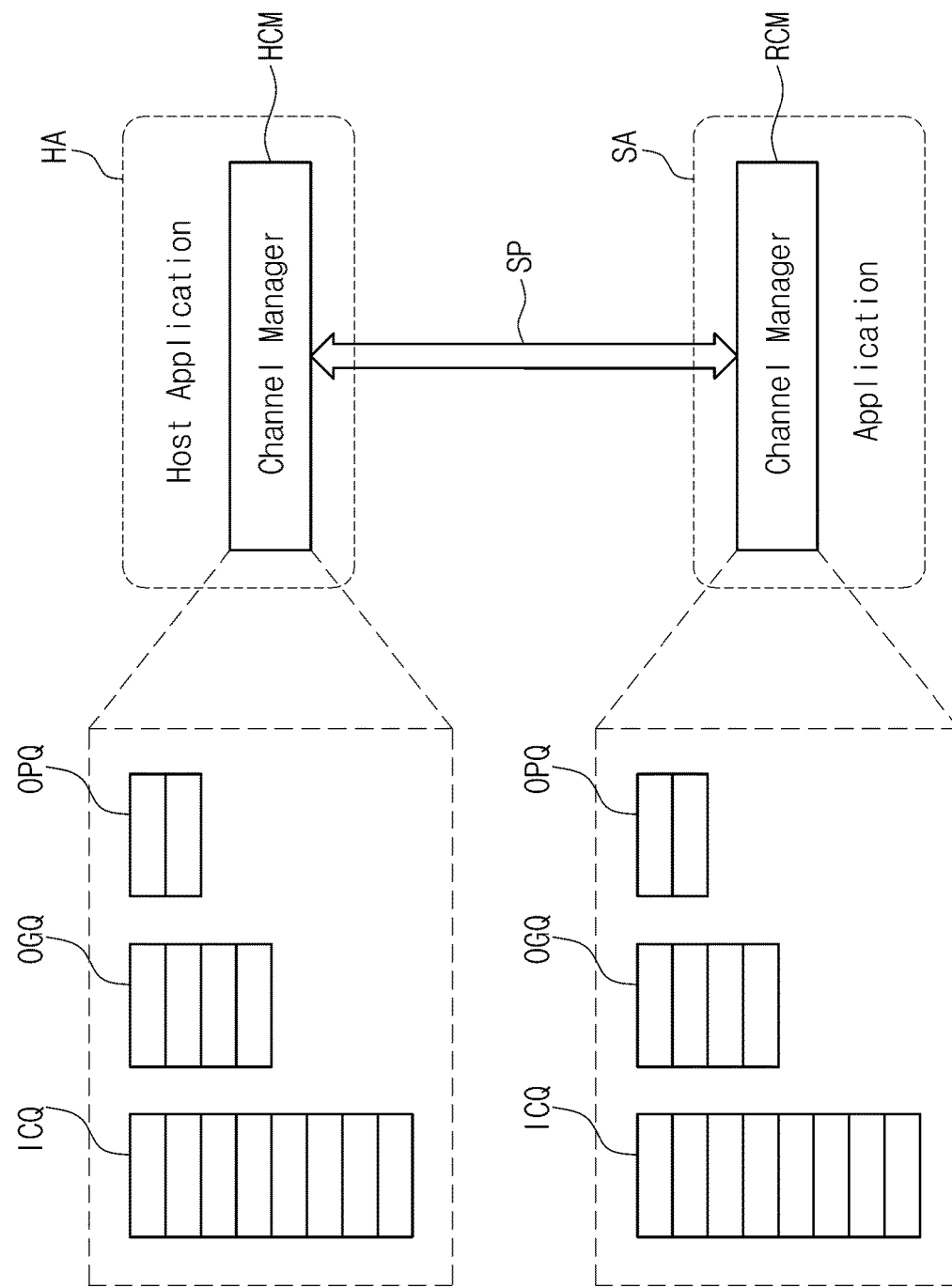
FIG. 10 shows an example embodiment in which a host application instance and an application instance communicate with each other.

FIG. 10 shows an example embodiment in which a the host application instance HA and the application instance SA communicate with each other.

Referring to FIGS. 9 and 10, the host application instance HA and the application instance SA may include a channel manager HCM and a channel manager RCM, which support communication, between the host application HA and the application instance SA, respectively. The channel managers HCM and RCM may communicate with each other using a serialized packet SP.

In an example, when the second storage instance SI2 sends data to the host application instance HA, the second storage instance SI2 may be configured to (i) call a serialization function to perform serialization, and (ii) transfer a serialized packet SP including serialized information to the host application instance HA through the channel managers RCM and HCM. Alternatively, the second storage instance SI2 may transfer a serialization tag and data to the channel manager RCM. That is, for example, the channel manager RCM may perform serialization in response to the serialization tag and may generate a serialized packet SP.

In an example embodiment, primitive data types such as 'char', 'int', 'double' and 'STL container' may be automatically serialized and de-serialized by the channel managers HCM and RCM. Accordingly, a serialization/de-serialization function may be overridden with respect to user-defined data types other than primitive data types.

Each of the channel managers HCM and RCM may include an incoming queue ICQ storing a received packet, an outgoing queue OGQ storing a packet to be transferred, and an outpending queue OPQ storing a packet being transferred. In an example embodiment, a depth of the incoming queue ICQ may be greater than or equal to a sum of a depth of the outgoing queue OGQ and a depth of the outpending queue OPQ.

The host application instance HA may enqueue a serialized packet SP in the outgoing queue OGQ of the channel manager HCM, and may dequeue a serialized packet SP from the incoming queue ICQ. The application instance SA may enqueue a serialized packet SP into the outgoing queue OGQ of the channel manager RCM, and may dequeue a serialized packet SP from the incoming queue ICQ.

In an example embodiment, the channel manager HCM may be supported by an operating system OS. The channel manager RCM may be supported by the storage runtime RT.

Figure 11:
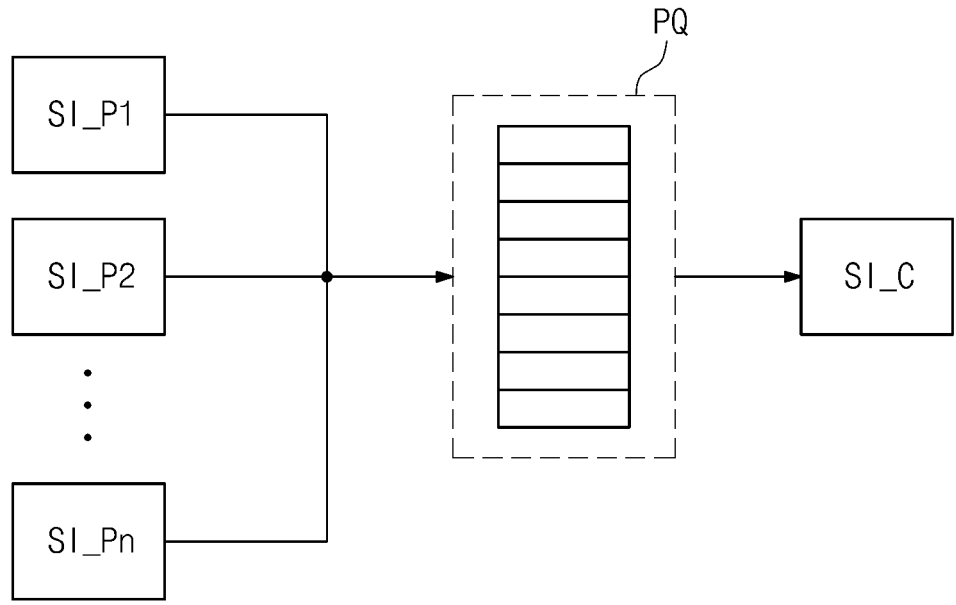
FIGS. 11 and 12 are block diagrams illustrating examples in which a port queue is between storage instances.
Figure 12:
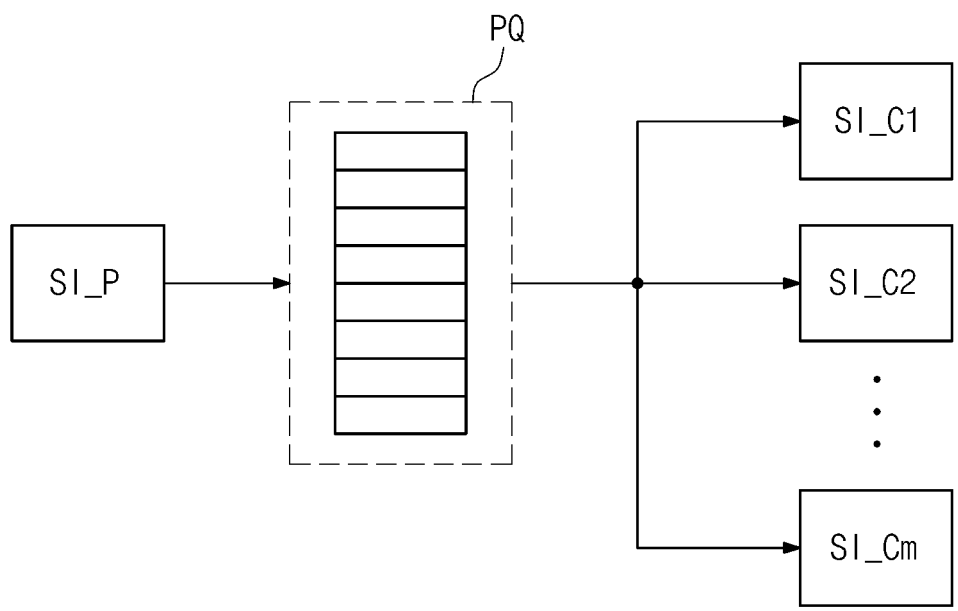

FIGS. 11 and 12 are block diagrams illustrating examples in which a port queue PQ is between storage instances.

Referring to FIG. 11, there is illustrated first to n-th producer storage instances SI_P1 to SI_Pn and a consumer storage instance SI_C. A port queue PQ may be provided between the producer storage instances SI_P1 to SI_Pn and the consumer storage instance SI_C. The producer storage instances SI_P1 to SI_Pn may enqueue output data into a port queue PQ. The consumer storage instance SI_C may dequeue data registered at the port queue PQ.

Referring to FIG. 12, the port queue PQ may be between one producer storage instance SI_P and the first to m-th consumer storage instances SI_C1 to SI_Cm. The producer storage instance SI_P may enqueue output data into the port queue PQ. The consumer storage instances SI_C1 to SI_Cm may dequeue data registered at the port queue PQ.

In an example embodiment, the number of producer storage instances connected to the port queue PQ and the number of consumer storage instances connected to the port queue PQ should not be limited to those discussed herein. Furthermore, a depth of the port queue PQ should not be limited to the depth discussed herein.

In an example embodiment, a depth and a location of the port queue PQ may be set by the host device 200 in connecting the storage instances.

Figure 13:
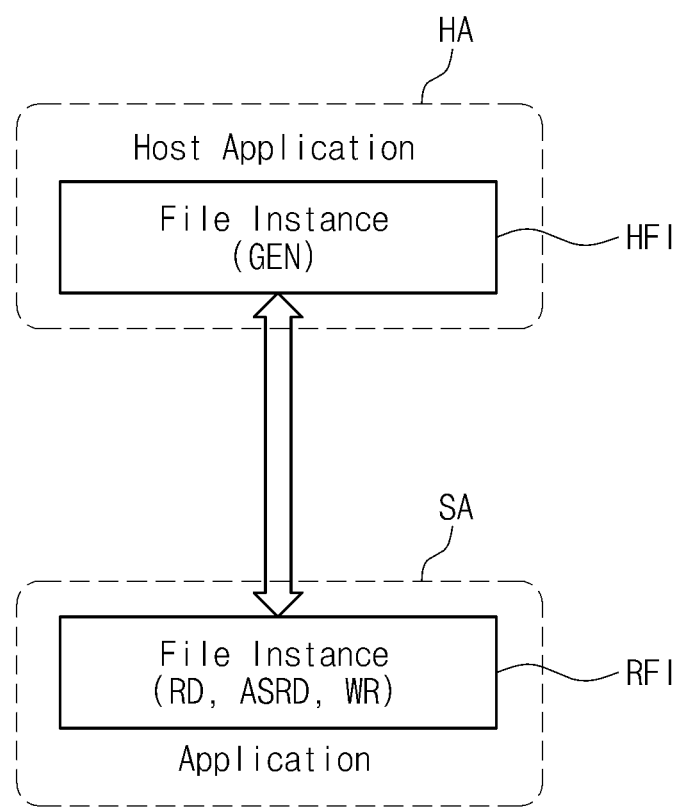
FIG. 13 is a block diagram illustrating an example embodiment of a method for generating and accessing a file.

FIG. 13 is a block diagram illustrating a method for generating and accessing a file, according to an example embodiment.

Referring to FIG. 13, the host application instance HA may call a file class based file instance HFI to perform file generation GEN. The application instance SA may call a file class based file instance RFI to perform read RD, asynchronous read ASRD, and write WR about a file.

That is, for example, when a file is accessed using the storage runtime RT, generation of a file may be allowed on the host application instance HA, and may not be allowed on the application instance SA. In contrast, read RD, asynchronous read ASRD, and write WR, about a generated file or an existing file, may be allowed on the application instance SA, and may not be allowed on the host application instance HA.

Figure 14:
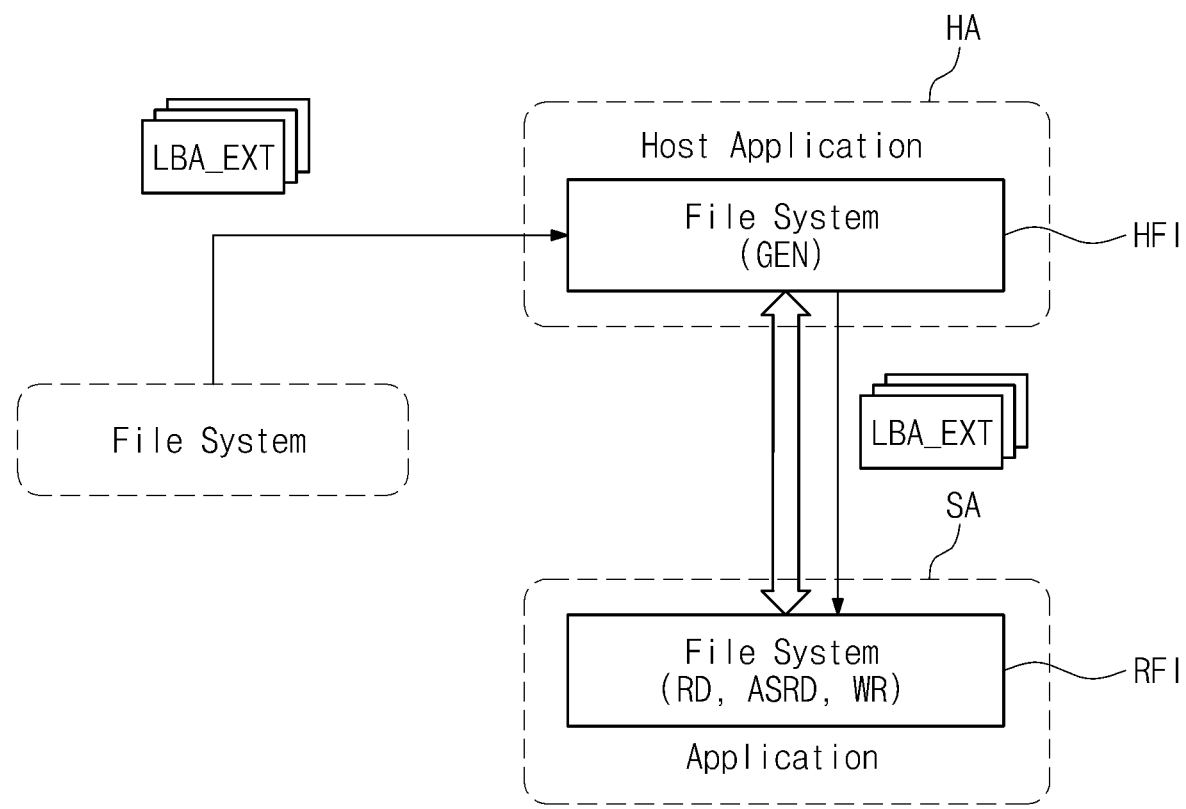
FIG. 14 is a block diagram illustrating an example condition which causes an application instance to access a nonvolatile memory device or a buffer memory.

FIG. 14 is a block diagram illustrating an example embodiment of an application instance SA being configured to access a nonvolatile memory device 110 and/or a buffer memory 130.

Referring to FIG. 14, the application instance SA may be prohibited from automatically generating an address, for example, a logical address, to access the nonvolatile memory device 110 and/or the buffer memory 130 itself. The application instance SA may be set to select a logical address in a logical address range LBA_EXT received in the form of an argument, or through a port from the host application instance HA. The application instance SA may also be configured to access the nonvolatile memory device 110 and/or the buffer memory 130.

For example, where data of a logical address selected by the application instance SA is stored in the buffer memory 130, the application instance SA may access the buffer memory 130 through a file instance RFI. Where data of a logical address selected by the application instance SA is stored in the nonvolatile memory device 110, the application instance SA may access the nonvolatile memory device 110 through the file instance RFI.

In an example embodiment, the host application instance HA may extract a range of logical addresses to be accessed. The host application instance HA may transfer the extracted logical address range LBA_EXT to the application instance SA.

In an example embodiment, the file instance HFI may be supported by an operating system OS. In another non-limiting example embodiment, the file instance HFI may be supported by the storage runtime RT.

Figure 15:
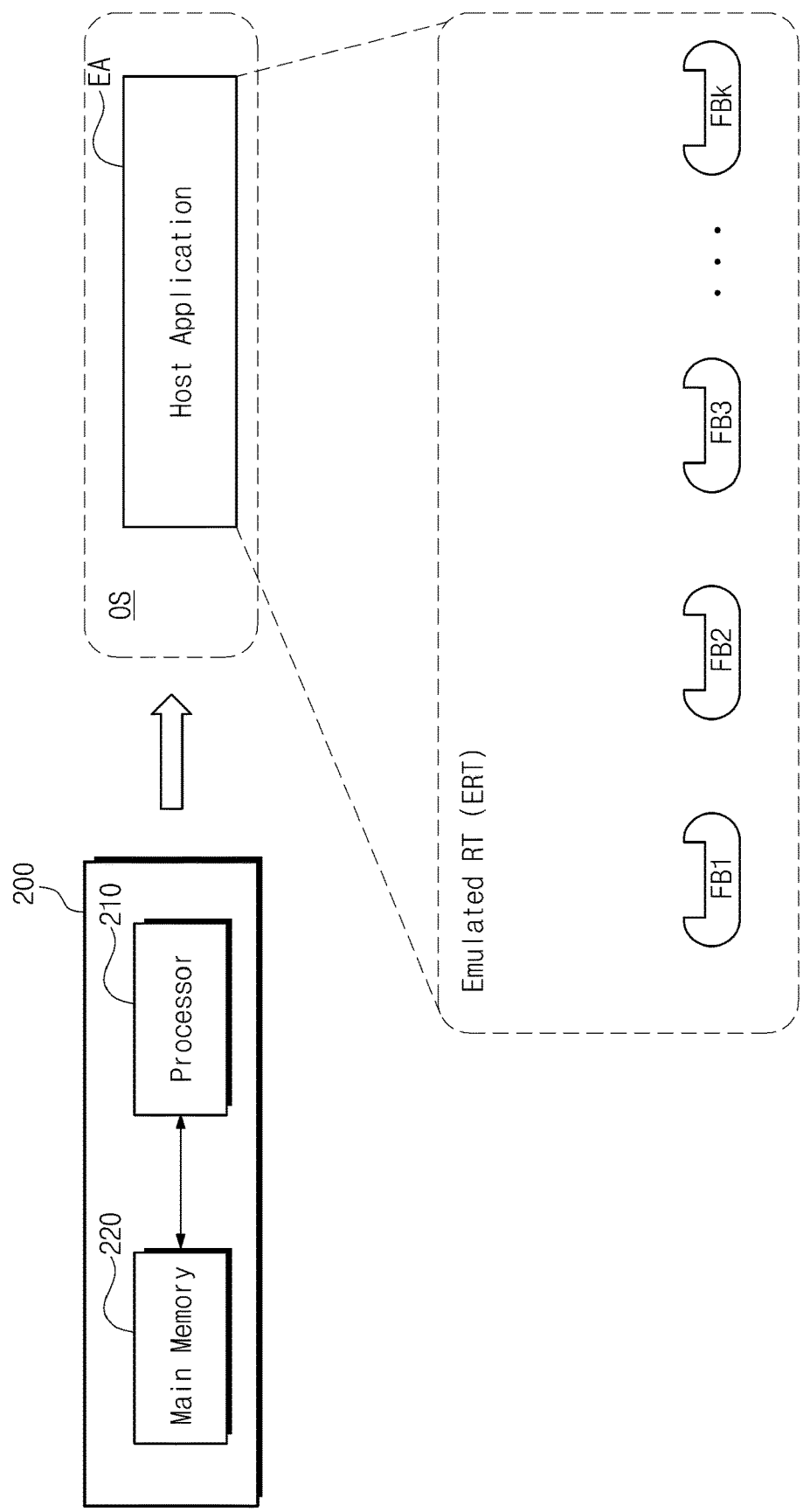
FIG. 15 shows an example in which a host device supports programming of an application class.

FIG. 15 shows an example embodiment in which a host device 200 supports programming of an application class (or a storage application class).

Referring to FIG. 15, an emulation application instance EA may be executed by an operating system OS. The emulation application instance EA may provide an emulated storage runtime ERT. The emulated storage runtime ERT may include a plurality of fibers FB1 to FBk. A user may program an application class using a library of the storage runtime RT on the emulated storage runtime ERT. The programmed application class may be executed and probed by an application instance on the emulated storage runtime RT. Each of the programmed application classes may have a class name CN. Each of the programmed application classes may be converted into a binary code. Binary codes of application classes may compose a module MOD.

Figure 16:
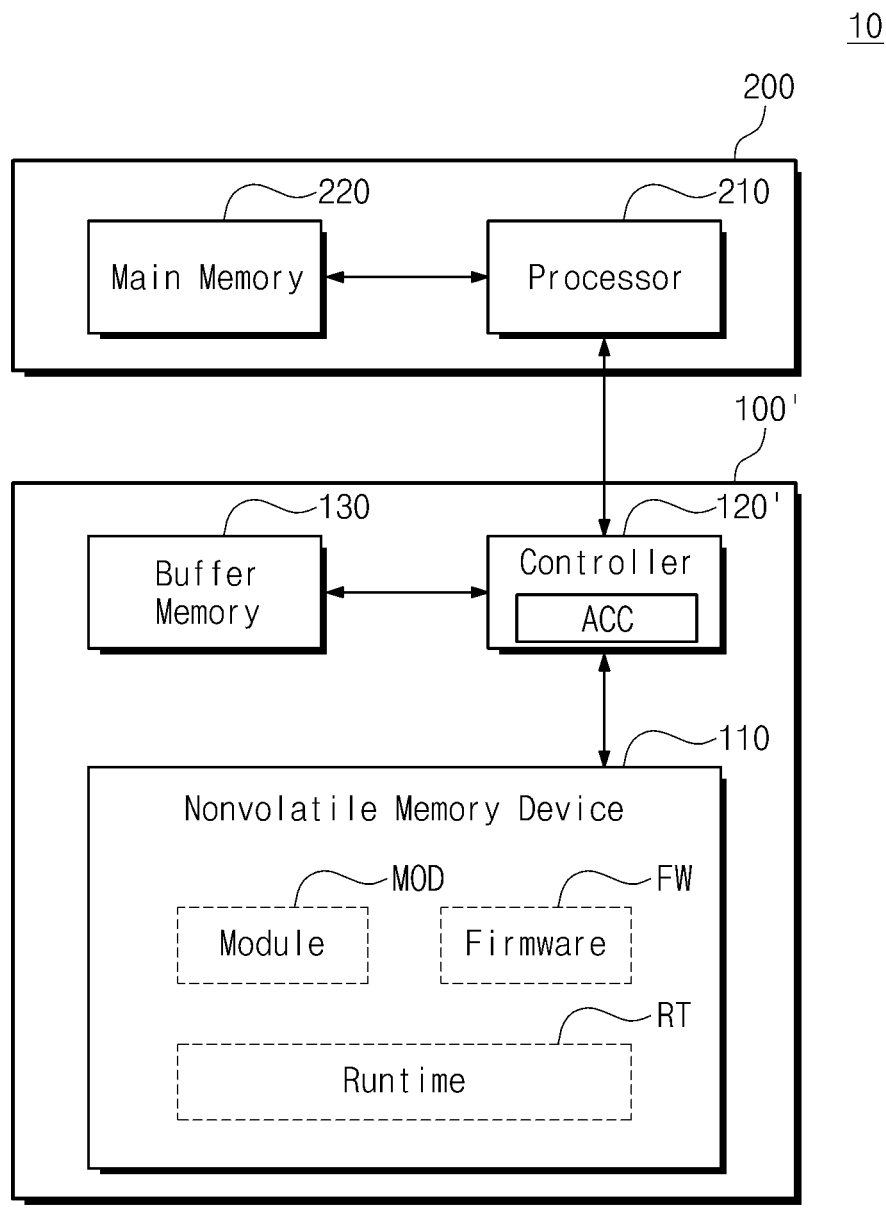
FIG. 16 is a block diagram illustrating example application of a computing device illustrated in FIG. 1.

FIG. 16 is block diagram illustrating an example application of a computing device 10 illustrated in FIG. 1.

Referring to FIG. 16, a computing device 10 may include a storage device 100' and a host device 200. Compared to the computing device 10 of FIG. 1, a controller 120' of the storage device 100' in the computing device 10 illustrated in FIG. 16 may include a hardware acceleration circuit ACC.

The hardware acceleration circuit ACC, according to an example embodiment of inventive concepts, may be configured to support a function of a specific application instance. That is, for example, the hardware acceleration circuit ACC may be configured to support word counting. If the hardware acceleration ACC circuit supports a function of a specific application instance, then an execution speed of a corresponding application instance may be improved.

Figure 17:
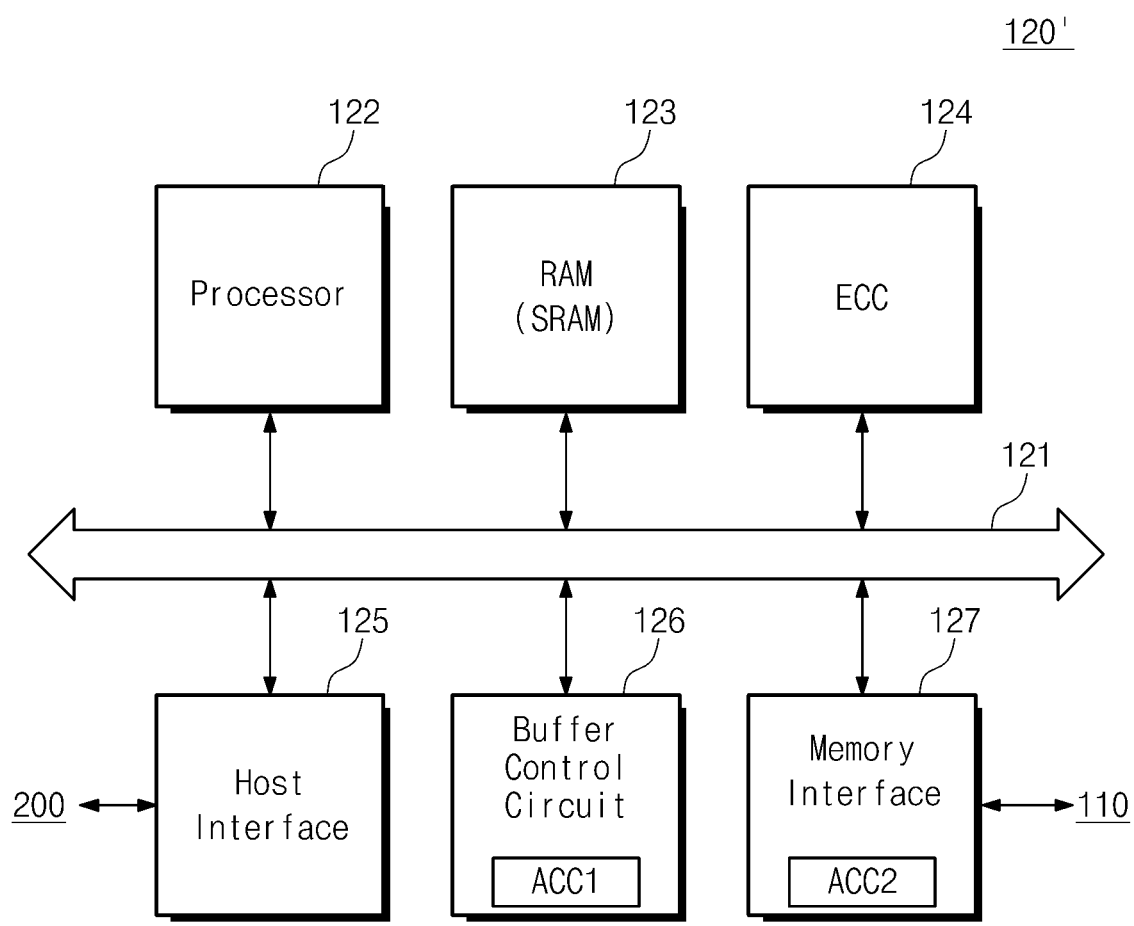
FIG. 17 is a block diagram illustrating a controller according to an example embodiment of inventive concepts.

FIG. 17 is a block diagram illustrating an example embodiment of the controller 120'.

Referring to FIGS. 16 and 17, the controller 120' may include a bus 121, a processor 122, a random access memory (RAM) 123, an error correction code (ECC) block 124, a host interface 125, a buffer control circuit 126, and a memory interface 127.

The bus 121 may be configured to provide a channel between components of the controller 120'.

The processor 122 may be configured to (i) control an overall operation of the controller 120, and may execute a logical operation. The processor 122 may be configured to communicate (i) with an external host device through the host interface 125, (ii) with the nonvolatile memory device 110 through the memory interface 127, and (iii) with the RAM 123 through the buffer control circuit 126. The processor 122 may also be configured to control the storage device 100 using the RAM 123 as a working memory, a cache memory, and/or a buffer memory.

The processor 122 may be configured to drive the storage runtime RT. The processor 122 may also be configured to manage the storage instances and the plurality of application instances based on the storage runtime RT. Furthermore, the processor 122 may be configured to drive firmware based on the storage runtime RT.

The RAM 123 may be used as a working memory, a cache memory, and/or a buffer memory of the processor 122. The RAM 123 may store code and/or commands executable by the processor 122. The RAM 123 may store data processed by the processor 122. The RAM 123 may include a static RAM (SRAM).

The ECC block 124 may be configured to perform an error correction operation. The ECC block 124 may be configured to perform error correction encoding based on data to be written at the nonvolatile memory 110 through the memory interface 127. The error correction encoded data may be transferred to the nonvolatile memory device 110 through the memory interface 127. The ECC block 124 may perform error correction decoding on data received through the memory interface 127 from the nonvolatile memory device 110. In a non-limiting example embodiment, the ECC block 124 may be included in the memory interface 127 as a component of the memory interface 127.

The host interface 125 may be configured to communicate with the external host device under control of the processor 122. The host interface 125 may convey communications using at least one of various communication methods, including, but not limited to, a universal serial bus (USB), a serial AT attachment (SATA), a high speed interchip (HSIC), a small computer system interface (SCSI), Firewire, a peripheral component interconnection (PCI), a PCI express (PCIe), a nonvolatile memory express (NVMe), a universal flash storage (UFS), a secure digital (SD), a multimedia card (MMC), embedded multi-media card (eMMC), a dual in-line memory module (DIMM), a registered DIMM (RDIMM) a load reduced DIMM (LRDIMM), and the like.

The buffer control circuit 126 may be configured to control the RAM 123 under the control of the processor 122. The buffer control circuit 126 may include a first hardware acceleration circuit ACC1. The first hardware acceleration circuit ACC1 may be configured to support a specific application instance or storage instance driven by the storage runtime RT. That is, for example, the first hardware acceleration circuit ACC1 may support word counting for a line, wherein the number of words of text data is read according to designation of the host device 200 from the buffer memory 130.

The memory interface 127 may be configured to communicate with the nonvolatile memory 110 under control of the processor 122. As described with reference to FIG. 1, the memory interface 127 may be configured to convey a command, an address, and data to the nonvolatile memory device 110 through the input/output channel. The memory interface 127 may convey a control signal to the nonvolatile memory device 110 through the control channel.

The memory interface 127 may include a second hardware acceleration circuit ACC2. The second hardware acceleration circuit ACC2 may be configured to support a specific application instance and/or storage instance driven by the storage runtime RT. That is, for example, the second hardware acceleration circuit ACC2 may be configured to support word counting for a line, wherein the number of words of text data that is read according to designation of the host device 200 from the buffer memory 110.

At least one example embodiment of inventive concepts illustrates the first hardware acceleration circuit ACC1 being placed in the buffer control circuit 126, and the second hardware acceleration circuit ACC2 being placed in the memory interface 127. However, a location of the hardware acceleration circuit should not be limited to this example. Rather, a hardware acceleration circuit may be implemented with an independent entity communicating with the bus 121.

In an example embodiment, the bus 121 of the controller 120 may be divided into a control bus and a data bus. The data bus may be configured to transfer data in the controller 120, and the control bus may transfer a command and an address in the controller 120'. The data bus and the control bus may be independent of each other to suppress and/or prevent mutual interference or influence. The data bus may be connected with the ECC block 124, the host interface 125, the buffer control circuit 126, and the memory interface 127. Whereas, the control bus may be connected with the processor 122, the RAM 123, the host interface 125, the buffer control circuit 126, and the memory interface 127.

In an example embodiment, the memory controller 120 of FIG. 1 may be similar to the memory controller 120' of FIG. 17 except with regards to the first hardware acceleration circuit ACC1 and the second hardware acceleration circuit ACC2. Thus, a further detailed description of the memory controller 120 of FIG. 1 is omitted.

In at least one example embodiment of inventive concepts, the storage runtime RT, the module MOD, and the firmware FW are stored in the nonvolatile memory device 110, and are loaded therefrom. However, the scope and spirit of inventive concepts should not be limited to these examples. That is, for example, one of the storage runtime RT, the module MOD, and the firmware FW or a combination of two or more thereof may be stored in a mask ROM or an EEPROM placed outside or inside the controller 120 and may be loaded therefrom.

Figure 18:
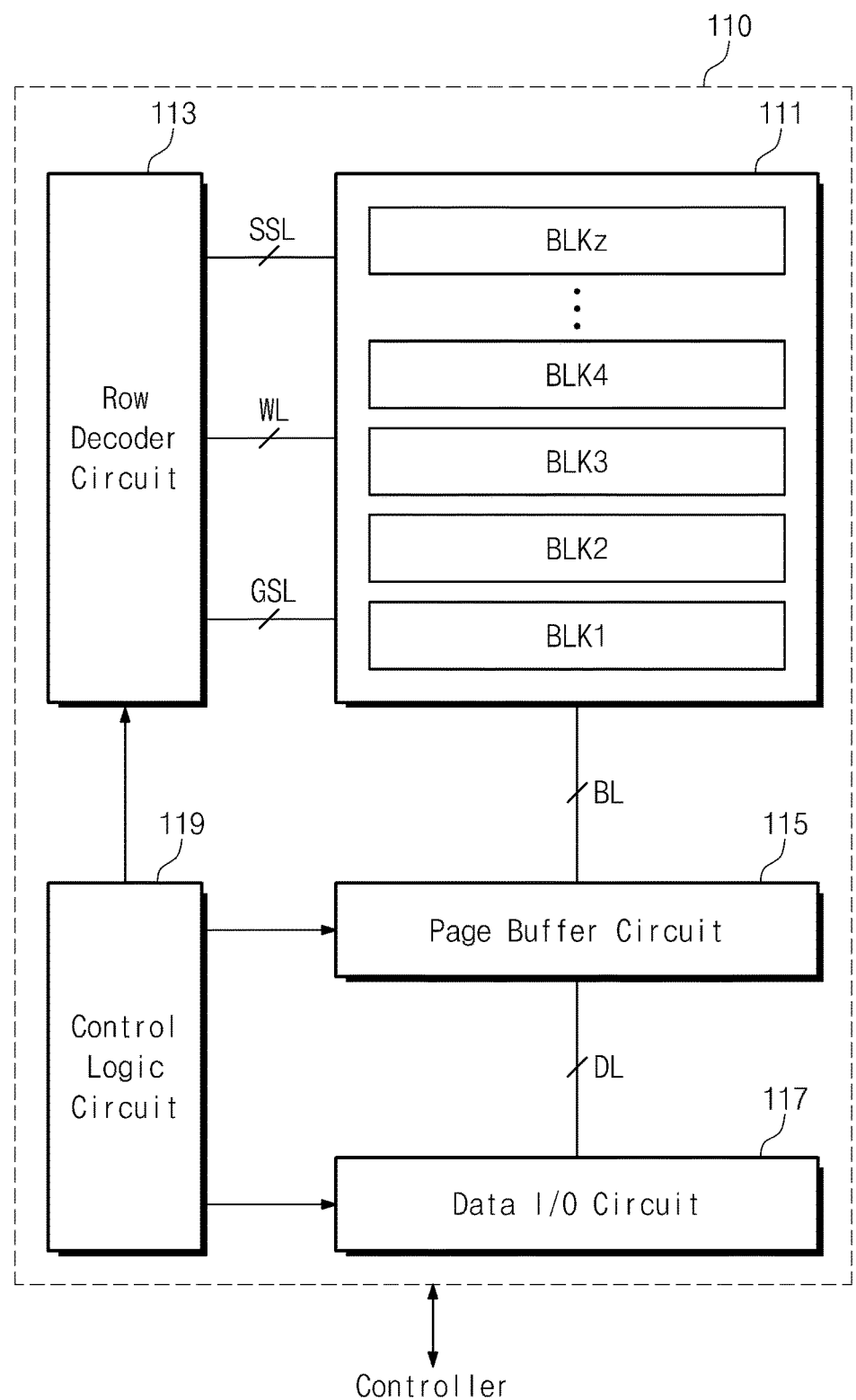
FIG. 18 is a block diagram illustrating a nonvolatile memory device according to an example embodiment of inventive concepts.

FIG. 18 is a block diagram illustrating a nonvolatile memory 110 according to an example embodiment of inventive concepts.

Referring to FIG. 18, a nonvolatile memory device 110 may include at least a memory cell array 111, a row decoder circuit 113, a page buffer circuit 115, a data input/output circuit 117, and a control logic circuit 119.

The memory cell array 111 may include a plurality of memory blocks BLK1 to BLKz. Each memory block may include a plurality of memory cells. Each memory bloc may be connected to the row decoder circuit 113 through at least one string selection line SSL, a plurality of word lines WL, and at least one ground selection line GSL. Each memory block may be connected to the page buffer circuit 115 through a plurality of bit lines BL. The memory blocks BLK1 through BLKz may be connected in common to the plurality of bit lines BL. Memory cells in the memory blocks BLK1 through BLKz may have the same or substantially the same structure.

In an example embodiment, each of the memory blocks BLK1 through BLKz may be a unit of an erase operation. An erase operation may be carried out by the memory block. Memory cells in a memory block may be erased at the same or substantially the same time. In another non-limiting example embodiment, each memory block may be divided into a plurality of sub-blocks. Erasing may be performed by the sub-block.

In another non-limiting example embodiment, each of the memory blocks BLK1 to BLKz may include a physical storage space, which is distinguished by a block address. Each of the word lines WL may correspond to a physical storage space, which is distinguished by a row address. Each of the bit lines BL may correspond to a physical storage space, which is distinguished by a column address.

The row decoder circuit 113 may be connected to the memory cell array 111 through a plurality of ground selection lines GSL, the plurality of word lines WL, and a plurality of string selection lines SSL. The row decoder circuit 113 may be configured to operate according to control of the control logic circuit 119. The row decoder circuit 113 may be configured to decode an address received from a controller 120 through an input/output channel and control voltages to be applied to the string selection lines SSL, the word lines WL, and the ground selection lines GSL based on the decoded address.

That is, for example, at programming, the row decoder circuit 113 may be configured to apply a program voltage to a selected word line in a memory block selected by an address. The row decoder circuit 113 may also be configured to apply a pass voltage to unselected word lines in the selected memory block. At reading, the row decoder circuit 113 may be configured to apply a selection read voltage to the selected word line in the selected memory block. The row decoder circuit 113 may also be configured to apply a non-selection read voltage to unselected word lines in the selected memory block. At erasing, the row decoder circuit 113 may be configured to apply an erase voltage (e.g., a ground voltage or a low voltage of which the level is similar to that of the ground voltage) to word lines in the selected memory block.

The page buffer circuit 115 may be connected to the memory cell array 111 through the bit lines 13L. The page buffer circuit 115 may be connected to the memory cell array 117 through the bit lines BL. The page buffer circuit 115 may be configured to operate in response to control of the control logic circuit 119.

During programming, the page buffer circuit 115 may store data to be programmed in memory cells. The page buffer circuit 115 may apply voltages to the bit lines BL based on the stored data. The page buffer circuit 115 may be configured to function as a write driver for a program operation. During reading, the page buffer circuit 115 may be configured to sense voltages on the bit lines BL and store the sensed results. The page buffer circuit 115 may also be configured to function as a sense amplifier for a read operation.

The data input/output circuit 117 may be connected to the page buffer circuit 115 through the data lines DL. The data input/output circuit 117 may be configured to output data to the controller 120 through the input/output channel, which is read by the page buffer circuit 115, and transfer data to the page buffer circuit 115, which is received from the controller 120 through the input/output channel.

The control logic circuit 119 may be configured to receive a command from the controller 120 through the input/output channel and receive a control signal therefrom through a control channel. The control logic circuit 119 may be configured to receive a command, which is received through the input/output channel in response to the control signal; route an address, which is received through the input/output channel to the row decoder circuit 113; and route data, which is received through the input/output channel to the data input/output circuit 117. The control logic circuit 119 may be configured to decode the received command and control the nonvolatile memory device 110 based on the decoded command.

In an example embodiment, the control logic circuit 119 may be configured to generate a data strobe signal DQS based on a read enable signal /RE received from the controller 120 through the input/output channel. The data strobe signal DQS may be outputted to the controller 120 through the control channel. At writing, the control logic circuit 119 may be configured to receive the data strobe signal DQS from the controller 120 through the control channel.

Figure 19:
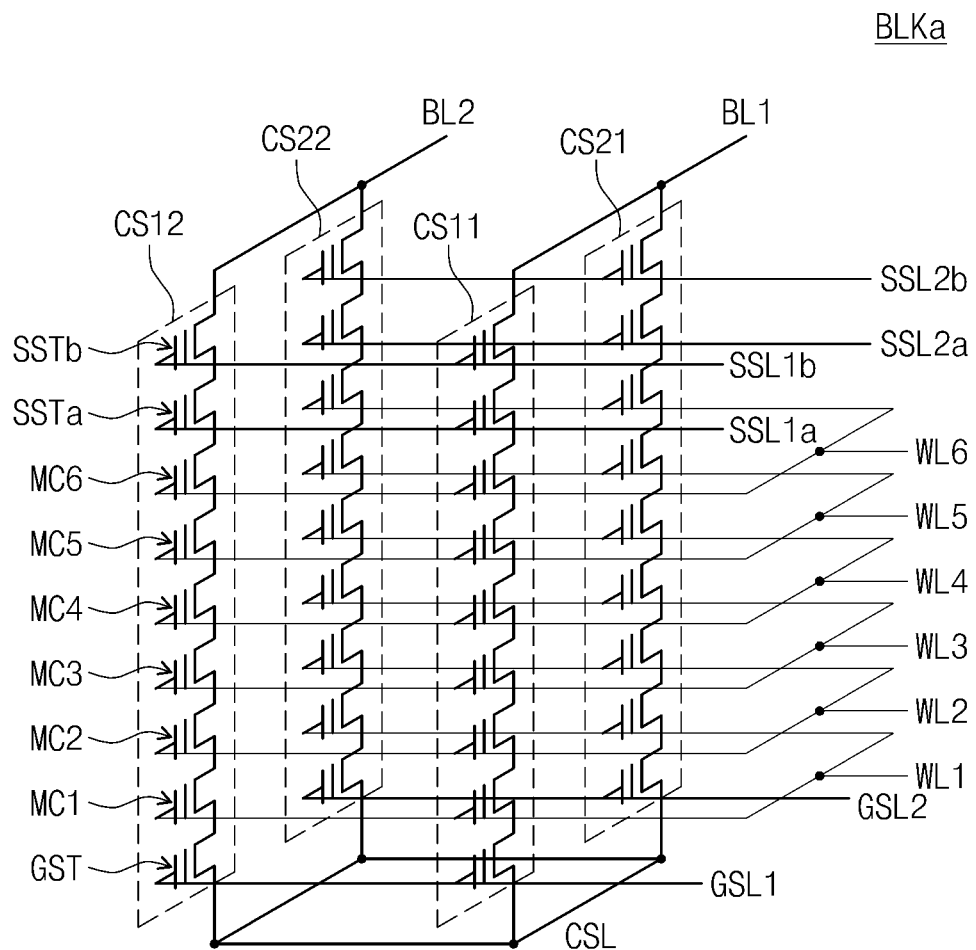
FIG. 19 is a circuit diagram illustrating a memory block according to an example embodiment of inventive concepts.
Figure 19:
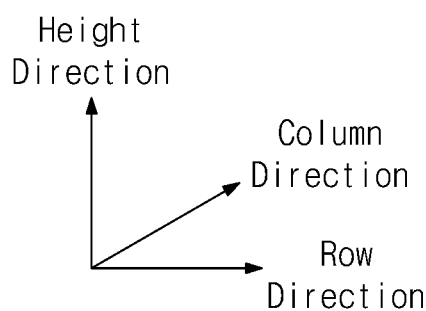

FIG. 19 is a circuit diagram schematically illustrating a memory block BLKa according to an example embodiment of inventive concepts.

Referring to FIG. 19, a memory block BLKa may include a plurality of cell strings CS11 to CS21 and CS12 to CS22. The plurality of cell strings CS11 to CS21 and CS12 to CS22 may be arranged in a matrix along a row direction or a column direction.

That is, for example, the cell strings CS11 and CS12 arranged along a row direction may constitute a first row, and the cell strings CS21 and CS22 arranged along the row direction may constitute a second row. The cell strings CS11 and CS21 arranged along a column direction may constitute a first column, and the cell strings CS12 and CS22 arranged along the column direction may constitute a second column.

Each cell string may contain a plurality of cell transistors. The cell transistors may include ground selection transistors GST, memory cells MC1 through MC6, and string selection transistors SSTa and SSTb. The ground selection transistors GST, memory cells MC1 through MC6, and string selection transistors SSTa and SSTb in each cell string may be stacked in a height direction perpendicular to a plane (e.g., a plane on a substrate of the memory block BLKa) on which the cell strings CS11 to CS21 and CS12 to CS22 are arranged along the rows and the columns.

Each cell transistor may be a charge trap type cell transistor of which the threshold voltage changes according to the amount of charges trapped in an insulating layer of each of the cell transistors.

Lowermost ground selection transistors GST may be connected in common to a common source line CSL.

Control gates of ground selection transistors GST of the cell strings CS11 to CS21 and CS12 to CS22 may be connected to ground selection lines GSL1 and GSL2, respectively. In an example embodiment, ground selection transistors GST in the same row may be connected to the same ground selection line, and ground selection transistors of different rows may be connected to different ground selection lines GSL1 and GSL2. That is, for example, the ground selection transistors GST in the first row may be connected to the first ground selection line GSL1, and the ground selection transistors GST of the cell strings CS21 and CS22 in the second row may be connected to the second ground selection line GSL2.

Connected in common to a word line are control gates of memory cells that are placed at the same or substantially the same height (or, order) from the substrate or, the ground selection transistors GST). Connected to different word lines WL1 to WL6 are control gates of memory cells that are placed at different heights (or, orders). That is, for example, the memory cells MC1 may be connected in common to the word line WL1. The memory cells MC2 may be connected in common to the word line WL2. The memory cells MC3 may be connected in common to the word line WL3. The memory cells MC4 may be connected in common to the word line WL4. The memory cells MC5 may be connected in common to the word line WL5. The memory cells MC6 may be connected in common to the word line WL6.

Still referring to FIG. 19, first string selection transistors SSTa are provided to each cell strings CS11 to CS21 and CS12 to CS22. The first selection transistors SSTa have the same or substantially the same height (or, order) as the cell strings CS11 to CS21 and CS12 to CS22. The control gates of the first string selection transistors SSTa in different rows may be connected to different string selection lines SSL1a and SSL2a, respectively. That is, for example, the first string selection transistors SSTa provided for the cell strings CS11 and CS12 may be connected in common to the string selection line SSL1a. Whereas, the first string selection transistors SSTa provided for the cell strings CS21 and CS22 may be connected in common to the string selection line SSL2a.

Second string selection transistors SSTb are provided to each cell strings CS11 to CS21 and CS12 to CS22. The second string selection transistors SSTb have the same or substantially the same height (or, order) as the cell strings CS11 to CS21 and CS12 to CS22. The control gates of the second string selection transistors SSTb in different rows may be connected to the different string selection lines SSL1a and SSL2a, respectively. That is, for example, the second string selection transistors SSTb of the cell strings CS11 and CS12 may be connected in common to the string selection line SSL1b. Whereas, the second string selection transistors SSTb provided for the cell strings CS21 and CS22 may be connected in common to the string selection line SSL2b.

Cell strings CS11 to CS21 and CS12 to CS22 in different rows may be connected to different string selection lines SSL1a, SSL1b, SSL2a and SSL2b. String selection transistors SSTa, SSTb with the same or substantially the same height (or, order) as cell strings CS11 to CS21 and CS12 to CS22 in the same row, may be connected to the same string selection line SSL1a, SSL1b, SSL2a and SSL2b, respectively. Alternatively, string selection transistors SSTa, SSTb with different heights (or, orders) as cell strings in the same row may be connected to different string selection lines SSL1a, SSL1b, SSL2a and SSL2b, respectively.

In an example embodiment, string selection transistors of cell strings in the same row may be connected in common to a string selection line. For example, the string selection transistors SSTa and SSTb of the cell strings CS11 and CS12 in a first row may be connected in common to a string selection line. The string selection transistors SSTa and SSTb of the cell strings CS21 and CS22 in a second row may be connected in common to a string selection line.

Columns of the cell strings CS11 to CS21 and CS12 to CS22 may be connected to different bit lines BL1 and BL2, respectively. For example, the string selection transistors SSTb of the cell strings CS11 and CS21 may be connected in common to the bit line BL1. The string selection transistors SSTb of the cell strings CS12 and CS22 may be connected in common to the bit line BL2.

The cell strings CS11 and CS12 may constitute a first plane. The cell strings CS21 and CS22 may constitute a second plane.

In the memory block BLKa, memory cells of each plane placed at the same or substantially the same height may compose a physical page. A physical page may be a unit of writing and reading the memory cells MC1 to MC6. One plane of the memory block BLKa may be selected by the string selection lines SSL1a, SSL1b, SSL2a, and SSL2b. The cell strings CS11 and CS12 in a first plane may be connected to the bit lines BL1 and BL2 when a turn-on voltage is supplied to the string selection lines SSL1a and SSL1b, and when a turn-off voltage is supplied to the string selection lines SSL2a and SSL2b. That is, for example, the first plane may be selected. The cell strings CS21 and CS22 in a second plane may be connected to the bit lines BL1 and BL2 when the turn-on voltage is supplied to the string selection lines SSL2a and SSL2b, and when the turn-off voltage is supplied to the string selection lines SSL1a and SSL1b. That is, for example, the second plane may be selected. In a selected plane, a row of memory cells MC may be selected by the word lines WL1 to WL6. In the selected row, a selection voltage may be applied to the second word line WL2, and a non-selection voltage may be applied to the remaining word lines WL1 and WL3 to WL6. That is, for example, a physical page which corresponds to the second word line WL2 of the second plane may be selected by adjusting voltages on the string selection lines SSL1a, SSL1b, SSL2a, and SSL2b and the word lines WL1 to WL6. A write or read operation may be performed with respect to memory cells MC2 in the selected physical page.

In the memory block BLKa, the memory cells MC1 to MC6 may be erased by the memory block or by the sub-block. When erasing is performed by the memory block, all or substantially memory cells MC in the memory block BLKa may be erased (e.g., simultaneously erased) according to an erase request (e.g., an erase request from an external memory controller). When erasing is performed by the sub-block, a portion of memory cells MC in the memory block BLKa may be erased (e.g., simultaneously erased) according to an erase request (e.g., an erase request from an external memory controller), and the other portion of the memory cell MC may be erase-inhibited. A low voltage (e.g., a ground voltage or a low voltage of which the level is similar or substantially similar to that of the ground voltage) may be supplied to a word line connected to erased memory cells MC, and a word line connected to erase-inhibited memory cells MC may be floated.

In an example embodiment, the memory block BLKa may include a physical storage space, which is distinguished by a block address. Each of the word lines WL1 to WL6 may correspond to a physical storage space, which is distinguished by a row address. Each of the bit lines BL1 and BL2 may correspond to a physical storage space, which is distinguished by a column address. Each of string selection lines SSL1a and SSL2a or SSL1b and SSL2b in different rows, or each of the ground selection lines GSL1 and GSL2 in different rows, may correspond to a physical storage space that is identified by a plane address.

The memory block BLKb shown in FIG. 19 is a non-limiting example embodiment of a memory block. However, the scope and spirit of inventive concepts should not be limited to the foregoing disclosure. That is, for example, the number of rows of cell strings may increase or decrease. As the number of rows of cell strings is changed, the number of string or ground selection lines and the number of cell strings connected to a bit line may also be changed.

The number of columns of cell strings may increase or decrease. If the number of columns of cell strings is changed, then the number of bit lines connected to columns of cell strings and the number of cell strings connected to a string selection line may also be changed.

A height of the cell strings may increase or decrease. For example, the number of ground selection transistors, memory cells, or string selection transistors that are stacked in each cell string may increase or decrease.

In an example embodiment, memory cells MC in a physical page may correspond to at least three logical pages. For example, k bits (k being an integer of 2 or more) may be programmed in a memory cell MC. In memory cells MC of one physical page, k logical pages may be implemented with k bits programmed in each memory cells MC.

That is, for example, a physical page may include a physical storage space, which is distinguished by a block address, a row address, a column address, and a plane address. One physical page may include two or more logical pages. Each of the logical pages may include a logical storage space, which is distinguished by an additional address (or an offset) for identifying logical pages as well as an address of a physical address.

According to an example embodiment of inventive concepts, an object application including a storage instance may be configured to be driven on a storage device, and thus, a task load of a host device may be distributed to the storage device.

The processor 210, controller 120, storage device 100, module MOD, storage device 100', controller 120', processor 120, row decoder circuit 113, control logic circuit 119, and page buffer circuit 115, as discussed above in detail with respect to example embodiments of inventive concepts, maybe implemented using hardware components, a processor executing software components, or a combination thereof. Upon execution of one or more algorithms, described in example embodiments of inventive concepts, the aforementioned hardware components, or processor executing software components, result in a special purpose processor. Algorithms, as presented in example embodiments of inventive concepts, constitute sufficient structure, that may comprise of, including but not limited to, mathematical formulas, flow charts, computer codes, and/or steps, which upon execution result in a special purpose processor or computer.

The one or more aforementioned processors are computer processing devices configured to carry out the program code by performing arithmetical, logical, and input/output operations. Once a program code is loaded into the one or more processors, the one or more processors may be programmed to perform the program code, thereby transforming the one or more processors into special purpose processor(s). Alternatively, or in addition to the processors discussed above, the hardware devices may include one or more Central Processing Units (CPUs), digital signal processors (DSPs), application-specific-integrated-circuits (ASICs), system on chips (SoCs), field programmable gate arrays (FPGAs), or the like. In at least some cases, the one or more CPUs, SoCs, digital signal processors (DSPs), application-specific integrated circuits (ASICs) and field-programmable gate arrays (FPGAs), may generally be referred to as processing circuitry, processing circuits and/or microprocessors.

The hardware devices may also include one or more storage devices. The one or more storage devices may be tangible or non-transitory computer-readable storage media, such as random access memory (RAM), read only memory (ROM), a permanent mass storage device such as a disk drive), and/or any other like data storage mechanism capable of storing and recording data. The one or more storage devices may be configured to store program code for one or more operating systems and/or the program code for implementing the example embodiments described herein. The program code may also be loaded from a separate computer readable storage medium into the one or more storage devices and/or the one or more processors using a drive mechanism. Such separate computer readable storage medium may include a USB flash drive, memory stick, Blu-ray/DVD/CD-ROM drive, memory card, and/or other like computer readable storage medium (not shown). The program code may be loaded into the one or more storage devices and/or the one or more processors from a remote data storage device via a network interface, rather than via a computer readable storage medium. Additionally, the program code may be loaded into the one or more storage devices and/or the one or more processors from a remote computing system that is configured to transfer and/or distribute the program code over a network. The remote computing system may transfer and/or distribute the program code via a wired interface, an air interface, and/or any other like tangible or intangible medium. The one or more processors, the one or more storage devices, and/or the program code may be specially designed and constructed for the purposes of the example embodiments, or they may be known devices that are altered and/or modified for the purposes of the example embodiments. While inventive concepts have been described with reference to example embodiments illustrated in accompanying drawings, these should be considered in a descriptive sense only, and it will be apparent to those skilled in the art that various changes and modifications may be made without departing from the spirit and scope of inventive concepts. Descriptions of features or aspects within each device or method according to example embodiments should typically be considered as available for other similar features or aspects in other devices or methods according to example embodiments. Therefore, it should be understood that the above example embodiments are not limiting, but illustrative. It will be understood by one of ordinary skill in the art that variations in form and detail may be made therein without departing from the spirit and scope of the claims.

What is claimed is:

1. A method of operating a computing device including a storage device, the method comprising:
    loading firmware, the firmware being configured to control at least one memory operation at the storage device, the at least one memory operation including at least one of a writing, reading or erasing operation;
    generating an application instance in the storage device based on a storage instance in the storage device according to a first request from a host device, the storage instance being a shuffler or a reducer;
    executing the application instance at the storage device to perform a task requested by the host device; and
    destructing the application instance based on a second request from the host device; wherein
        the shuffler is configured to group pairs, having the same word, from among word and token pairs, and output pair groups, or
        the reducer is configured to calculate a sum of tokens in each pair group, and output pairs of a word and the sum.

2. The method of claim 1, further comprising:
    executing a power-on initialization at the storage device;
    loading a storage runtime on the storage device, the storage runtime supporting a plurality of fibers; and
    executing the firmware,
    wherein the firmware is loaded onto at least one of the plurality of fibers.

3. The method of claim 1, wherein the generating the application instance comprises:
    transferring a signature to the storage device.

4. The method of claim 1, wherein the generating the application instance comprises:
    loading a binary module onto the storage device, the binary module including an object class associated with the storage instance, the binary module being associated with a module identifier.

5. The method of claim 4, wherein the loading a binary module comprises:
    obtaining identifiers of binary modules from the storage device; and
    loading, from the storage device, the binary module corresponding to an identifier selected from the identifiers.

6. The method of claim 4, further comprising:
    inputting the binary module to the storage device; and
    inputting the module identifier to the storage device.

7. The method of claim 4, wherein the generating the application instance further comprises:
    generating an empty application instance; and
    assigning an application identifier to the empty application instance.

8. The method of claim 7, further comprising:
    generating the storage instance on the storage device based on the binary module;
    registering the storage instance; and
    associating an object identifier with the application instance.

9. The method of claim 8, further comprising:
    probing the storage instance to determine a validity of the storage instance.

10. The method of claim 1, further comprising:
    connecting two or more storage instances in the application instance.

11. The method of claim 10, wherein the connecting the two or more storage instances comprises:

connecting an output port of a first of the two or more storage instances with an input port of a second of the two or more storage instances.

12. The method of claim 11, wherein the connecting the two or more storage instances comprises:
generating a queue between the output port of the first of the two or more storage instances and the input port of the second of the two or more storage instances.

13. The method of claim 10, further comprising:
connecting at least one of the two or more storage instances to the host device based on a third request received from the host device; and
communicating between the host device and the at least one of the two or more storage instances based on a serialized packet.

14. The method of claim 1, further comprising:
generating, by the host device, a file to be stored in the storage device; and
accessing the file through the application instance.

15. A method of operating a computing device including a storage device, the method comprising:
generating an application instance in the storage device based on a storage instance in the storage device, the storage instance being a shuffler or a reducer;
executing the application instance at the storage device;
receiving a range of logical addresses at the application instance;
accessing, by the application instance, a nonvolatile memory device based on the range of logical addresses; and
counting, by the application instance, a number of events that a word appears, among data accessed by the application instance, the word given from a host device; wherein
the shuffler is configured to group pairs, having the same word, from among word and token pairs, and output pair groups, or
the reducer is configured to calculate a sum of tokens in each pair group, and output pairs of a word and the sum.

16. A method of operating a computing device, the method comprising:
generating, at a storage device, an application instance by connecting a plurality of storage instances with one another, the plurality of storage instances including a shuffler or a reducer, and at least a first of the plurality of storage instances connected to a host device according to a first request from the host device;
receiving, at a storage device, a second request to execute the application instance; and
destructing the application instance at the storage device by disconnecting the plurality of storage instances in response to a third request; wherein
the shuffler is configured to group pairs, having the same word, from among word and token pairs, and output pair groups, or
the reducer is configured to calculate a sum of tokens in each pair group, and output pairs of a word and the sum.

17. The method of claim 16, further comprising:
receiving a range of logical addresses at the application instance; and
accessing, by the application instance, a nonvolatile memory device at the storage device based on the range of logical addresses.

18. The method of claim 16, further comprising:
connecting the plurality of storage instances with one another.

19. The method of claim 16, wherein the storage device includes a flash memory device, the flash memory device including a three-dimensional memory array.

20. The method of claim 19, wherein the three-dimensional memory array includes a non-volatile memory that is monolithically formed in one or more physical levels of memory cells having active areas above a silicon substrate.

* * * * *